US011262826B2

(12) United States Patent
Hand et al.

(10) Patent No.: US 11,262,826 B2
(45) Date of Patent: Mar. 1, 2022

(54) MULTIPLE POWER INPUT CHARGING

(71) Applicant: INTEL CORPORATION, Santa Clara, CA (US)

(72) Inventors: Teal Hand, Beaverton, OR (US); Alexander B. Uan-Zo-li, Hillsboro, OR (US); Andy Keates, Los Gatos, CA (US)

(73) Assignee: INTEL CORPORATION, Santa Clara, CA (US)

(*) Notice: Subject to any disclaimer, the term of this patent is extended or adjusted under 35 U.S.C. 154(b) by 114 days.

(21) Appl. No.: 16/737,114

(22) Filed: Jan. 8, 2020

(65) Prior Publication Data
US 2020/0142463 A1 May 7, 2020

(51) Int. Cl.
G06F 1/26 (2006.01)
(52) U.S. Cl.
CPC .............. G06F 1/263 (2013.01); G06F 1/266 (2013.01)

(58) Field of Classification Search
None
See application file for complete search history.

(56) References Cited

U.S. PATENT DOCUMENTS 9,710,051 B2* 7/2017 Muccini ................ G06F 1/3287
2011/0161683 A1* 6/2011 Zou ....................... G06F 1/266
713/300
2013/0339757 A1* 12/2013 Reddy ................... G06F 1/3212
713/300
2020/0144854 A1* 5/2020 Hsu ....................... H02J 9/062

* cited by examiner

Primary Examiner — Paul Yen
(74) Attorney, Agent, or Firm — Schwabe, Williamson & Wyatt, P.C.

(57) ABSTRACT

In some examples, an apparatus can control power provision to a computing device. A controller is to provide power to the computing device from a first power source at a power level above a sustained power rating of the first power source for a first time period, and is to provide power to the computing device from a second power source at a power level above a sustained power rating of the second power source for a second time period after the first time period.

21 Claims, 13 Drawing Sheets

700

800A

800C

900

MULTIPLE POWER INPUT CHARGING

TECHNICAL FIELD

This disclosure relates generally to charging using multiple power inputs and/or multiple power adapters.

BACKGROUND

Mobile computing devices can include devices such as cellular phones smartphones, tablets, wearables, notebooks, laptops, personal digital assistants, and/or mobile processor based platforms, among others. Many mobile computing devices include Universal Serial Bus (USB) type C power delivery (PD). In fact, the mobile computing industry appears to be moving toward USB type C power delivery (PD) as a preferred option for external power sourcing for all devices. Such an external power source can be, for example, a power source such as an alternating current (AC) power adapter. The external power source may have a capability, for example, as low as 5 Watts and as high as 130 Watts (20V, 6.5 A). This may be implemented in order to promote universal charging to increase usability and user satisfaction. In fact, any mobile device may be used with any range of power requirements and may consume power from a connected USB Type C source.

BRIEF DESCRIPTION OF THE DRAWINGS

The following detailed description may be better understood by referencing the accompanying drawings, which contain specific examples of numerous features of the disclosed subject matter.

FIG. 8, which includes

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
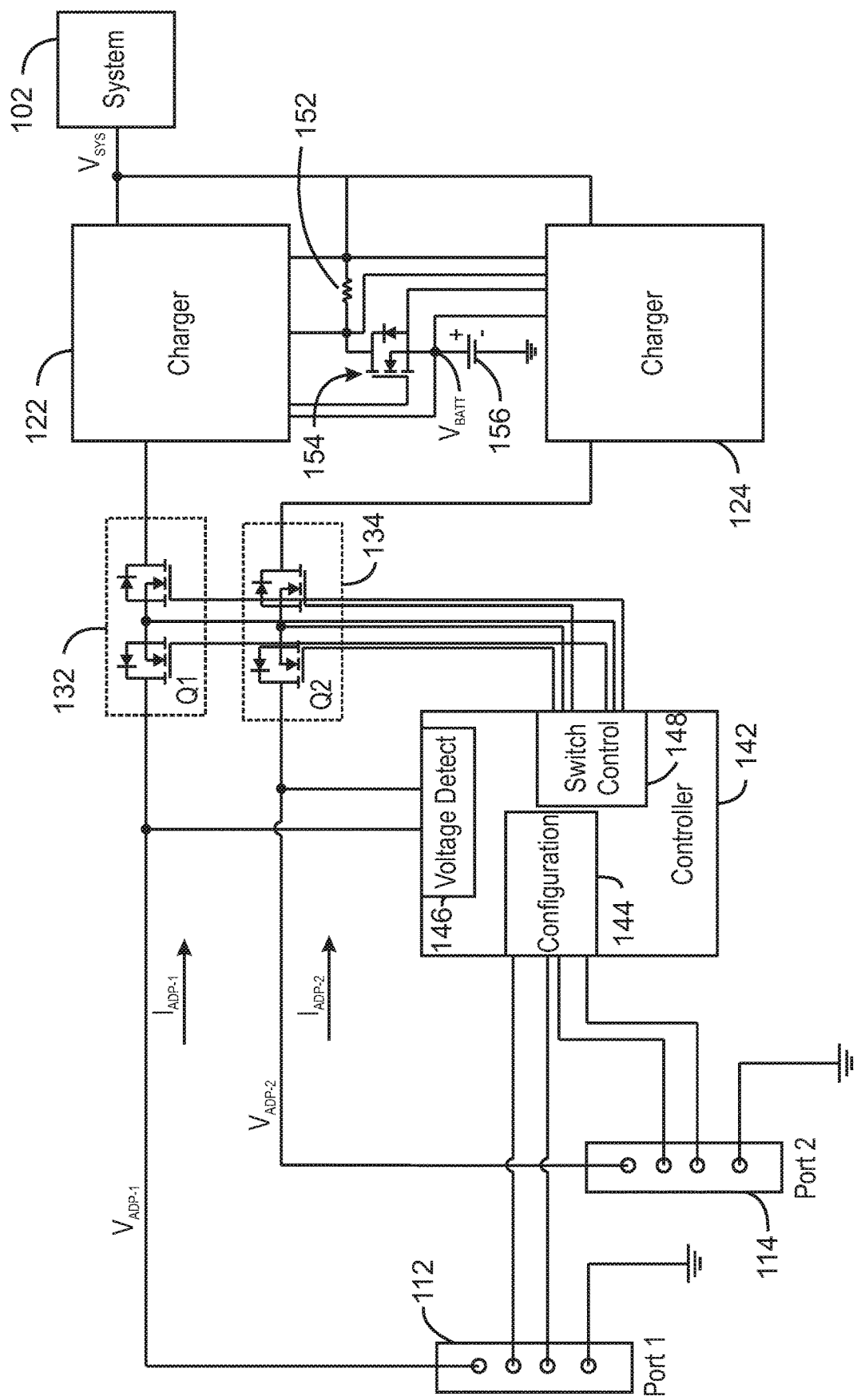
FIG. 1 illustrates a system with two ports that may be used to provide power from two adapters that may each provide power to a respective charger in the system.

Some embodiments relate to battery charging. Some embodiments relate to charging using multiple power inputs and/or multiple power adapters. Some embodiments relate to dual input charging. Some embodiments relate to multiple input charging. Some embodiments relate to dual input charging and/or multiple input charging for a Narrow Voltage Direct Charging (NVDC) charger. Some embodiments relate to dual input charging and/or multiple input charging for a buck-boost charger.

As discussed above, many mobile computing devices include Universal Serial Bus (USB) type C power delivery (PD). In fact, the mobile computing industry appears to be moving toward USB type C power delivery (PD) as a preferred option for external power sourcing for all devices. Such an external power source can be, for example, a power source such as an alternating current (AC) power adapter. The external power source may have a capability, for example, as low as 5 Watts and as high as 130 Watts (20V, 6.5 A). This may be implemented in order to promote universal charging to increase usability and user satisfaction. In fact, any mobile device may be used with any range of power requirements and may consume power from a connected USB Type C source.

A wide variety of AC adapters may be used with varying output power capability and different output voltage levels. A minimum accepted sustained power rating for a USB-C source to supply power to a laptop, for example, might be 5 volts (5V), 1.5 amps (1.5 A), and 7.5 Watts. Charging the battery may take a long time, and may even discharge the battery while the system is consuming power. Additionally, the laptop may still consume power from the connected AC adapter.

When a mobile computing device user (such as a laptop user) is travelling, the user may discover that they may have two low power AC adapters. The user may wish to use both of the low power AC adapters to charge the mobile computing device as quickly as possible before leaving the vicinity of the power source. The user may also wish to run the system with peak performance while simultaneously charging the battery. Most available solutions allow only one adapter to be used at a time, and connecting a second adapter will not accelerate battery charging.

In order to allow two power adapters to be used at the same time, a mobile computing system might include two separate buck-boost battery chargers on the motherboard of the system. However, this can increase cost and size of the platform. Therefore, some options include using only one AC adapter at a time, and other options include the board using two or more buck-boost battery chargers which increase the system cost and size.

In some embodiments, two or more power adapters (such as AC power adapters) may be used to supply power to a computing platform (such as a mobile computing device) while only requiring one battery charger. This may be achieved in accordance with some embodiments by switching between one adapter and another while consuming more power from each adapter than it is designed to consume for a short enough duration that the integrity of the adapter is not compromised. This switching between adapters may be implemented, for example, by alternately coupling the adapters to a battery charger. The switching between power adapters may be referred to as a "round robin" solution where each adapter is alternately assigned a time slot during which it is coupled to the same battery charger. In some embodiments, by quickly jumping from one adapter to another, consumed power may be averaged and may be equal to a sum of the designed and specified powers of two or more adapters.

In some embodiments, computing devices (such as mobile computing devices) allow the system to draw power from all connected power adapters (for example, from all connected AC power adapters). In this manner, battery charging may be supported, and the system may be capable of simultaneously powering the system without requiring an extra cost and size of additional circuitry associated with adding additional battery chargers to the system, for example.

In some embodiments, in a system with two or more USB Type-C ports, for example, two pass field effect transistors (two pass-FETs) may be included in the system (for example, back to back) on each input in order to avoid shorting together multiple sources. These FETs may be used to switch from one source to another source in order to combine the adapter power dynamically (on average).

FIG. 1 illustrates a device 100 or system 100 (for example, a computing device 100 or a computing system 100). In some embodiments, computing device 100 may be a mobile computing device, for example. Device 100 may include a system 102 to which power may be supplied by two or more power adapters respectively coupled to two or more ports 112 and 114 (for example, through port 1 and port 2). Adapters may be coupled to ports 112 and 114, which may each include, for example, a $V_{BUS}$ voltage pin, two configuration pins such as USB Type-C configuration pins CC1 and CC2, and a ground pin GND. Device 100 may also include chargers 122 and 124 (for example, battery chargers 122 and 124, buck chargers 122 and 124, boost chargers 122 and 124, NVDC chargers 122 and 124, buck boost NVDC chargers 122 and 124, and/or buck-boost battery chargers 122 and 124), switches 132 and 134 (Q1 and Q2) including transistors such as field effect transistors (FETs), and a controller 142 (for example, a power delivery controller, and/or a USB Type-C PD controller). Controller 142 may include configuration logic 144 (for example, USB Type-C CC logic), a voltage detector 146 to detect voltage $V_{ADP-1}$ and $V_{ADP-2}$, and a switch controller 148 to control switches 132 and 134. Device 100 also includes a resistor 152 (which may be used as a battery current sensor 152), FET 154, and battery 156. Adapters 112 and 114, chargers 122 and 124, switches 132 and 134, and controller 142 may be used to alternately charge battery 156 in accordance with some embodiments. In this manner, two power adapters coupled to two ports 112 and 114 such as AC power adapters (for example, two low power adapters such as two AC low power adapters) may be used to charge the device 100 as fast as possible before leaving a power source, for example. Alternatively, the device 100 and system 102 may be run (for example, at peak power and/or at peak performance) while the battery 156 is being simultaneously charged. In some embodiments, more than two adapters and/or more than two chargers may be included in device 100. In some embodiments, one battery charger may be used to alternately charge a battery. Using one battery charger rather than two or more battery chargers can save cost and size of the platform of the device.

Although FIG. 1 illustrates controller 142 to provide control of the system (for example, such as controlling switches 132 and 134) it is noted that in some embodiments, some or all functions of controller 142 may be implemented elsewhere. For example, in some embodiments, some or all functions of controller 142 may be included in charger 122 and/or in charger 124, and/or may be included in a controller of charger 122 and/or in a controller of charger 124, for example.

Figure 2:
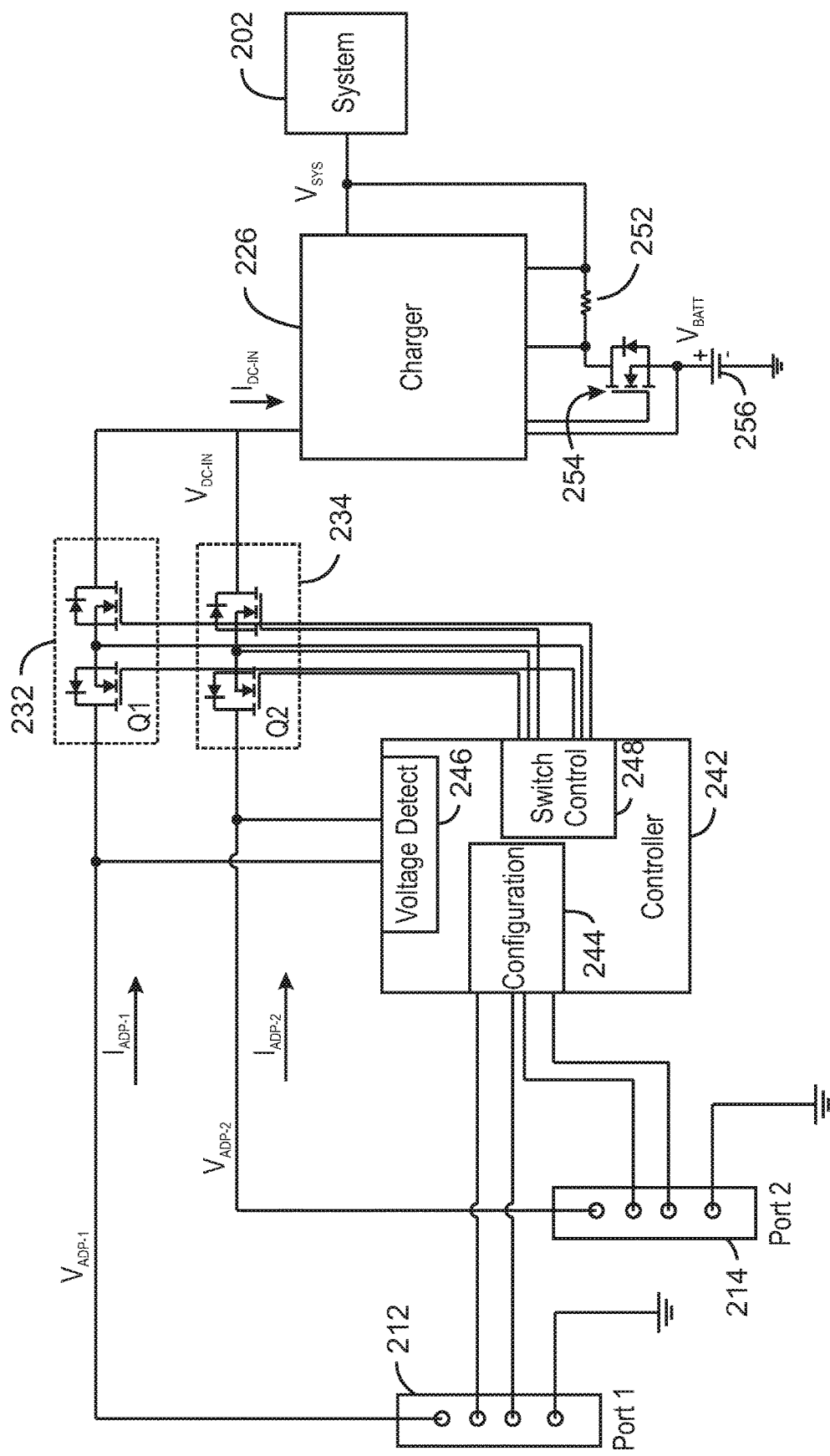
FIG. 2 illustrates a system with two ports that may be used to combine power from two adapters that may provide power to a charger in the system.

FIG. 2 illustrates a device 200 or system 200 (for example, a computing device 200 or a computing system 200). In some embodiments, computing device 200 may be a mobile computing device, for example. Device 200 may include a system 202 to which power may be supplied by two or more power adapters coupled to ports 212 and 214 (for example, through port 1 and port 2). In some embodiments, FIG. 2 illustrates a system 200 with two USB Type-C ports 212 and 214 used to couple two power adapters to system 200. Although system 200 is illustrated as including two ports and/or two adapters, more ports and/or more adapters may be included in some embodiments.

Adapter ports 212 and 214 may each include, for example, a $V_{BUS}$ voltage pin, two configuration pins such as USB Type-C configuration pins CC1 and CC2, and a ground pin GND. Device 200 may also include a charger 226 (for example, a battery charger 226, a buck charger 226, a boost charger 226, an NVDC charger 226, a buck boost NVDC charger, and/or a buck-boost battery charger 226), switches 232 and 234 (Q1 and Q2) including transistors such as field effect transistors (FETs), and a controller 242 (for example, a power delivery controller, and/or a USB a USB Type-C PD controller). Controller 242 may include configuration logic 244 (for example, USB Type-C CC logic), a voltage detector 246 to detect voltage $V_{ADP-1}$ and $V_{ADP-2}$, and a switch controller 248 to control switches 232 and 234. Device 200 also includes a resistor 252 (which may be used as a battery current sensor 252), FET 254, and a battery 256. Adapter ports 212 and 214, charger 226, switches 232 and 234, and controller 242 may be used to alternately charge battery 256 in accordance with some embodiments. In this manner, two power adapters coupled to ports 212 and 214 such as AC power adapters (for example, two low power adapters such as two AC low power adapters) may be used to charge the device 200 as fast as possible before leaving a vicinity of a power source, for example. Alternatively, the device 200 and system 202 may be run (for example, at peak power and/or at peak performance) while the battery 256 is being simultaneously charged. In some embodiments, any plurality of two or more adapters may be included in device 200.

In some embodiments, device 200 includes a platform with two type C USB ports 212 and 214. Power from adapters coupled to adapter ports 212 and 214 may be combined to power on the system 200 and/or system 202, and to charge the battery 256 when multiple power sources are connected to adapter ports 212 and/or 214. As mentioned above, system 200 is not limited to two ports or to two external power adapters (or to two external power sources). The number of external power sources that may be used to charge the system may only be limited, for example, by a number of ports (for example, by a number of USB Type C ports) on the motherboard of the system. In some embodiments, adapters connected to the ports and an adapter connected to a barrel adapter input may be combined if both power input methods are supported.

In some embodiments, in system 200 (and/or in system 100) the system 100, 102, 200, and/or 202, will consume power from one adapter for a certain amount of time, and then switch to another adapter (for example, will consume power from one adapter for a certain amount of time, and then switch to another adapter for a certain amount of time). The consumption of power may be implemented in a round-robin approach where the coupling of adapters is alternated (for example, using controllers and/or switches) to provide charging from each adapter. This may be implemented, for example, by consuming more power from each adapter than the adapter is designed for a short enough duration that the integrity of each adapter is not compromised. Such an approach (for example, a round-robin approach cycling and/or alternating between adapters) may allow consumed power to be averaged and be approximately equal to a sum of the power of each power adapter (for example, of each AC adapter). During each duration, the system can consume more power from each adapter than for which the adapter is rated for a short enough duration that the integrity of the adapter is not compromised. Adapter protection and output decoupling may be used in accordance with some embodiments. After output decoupling of one adapter is exhausted, for example, the system can switch to drain the power from another adapter while allowing the first adapter to recover.

Although FIG. 2 illustrates controller 242 to provide control of the system (for example, such as controlling switches 232 and 234) it is noted that in some embodiments, some or all functions of controller 242 may be implemented elsewhere. For example, in some embodiments, some or all functions of controller 242 may be included in charger 226 and/or may be included in a controller of charger 226.

Figure 3:
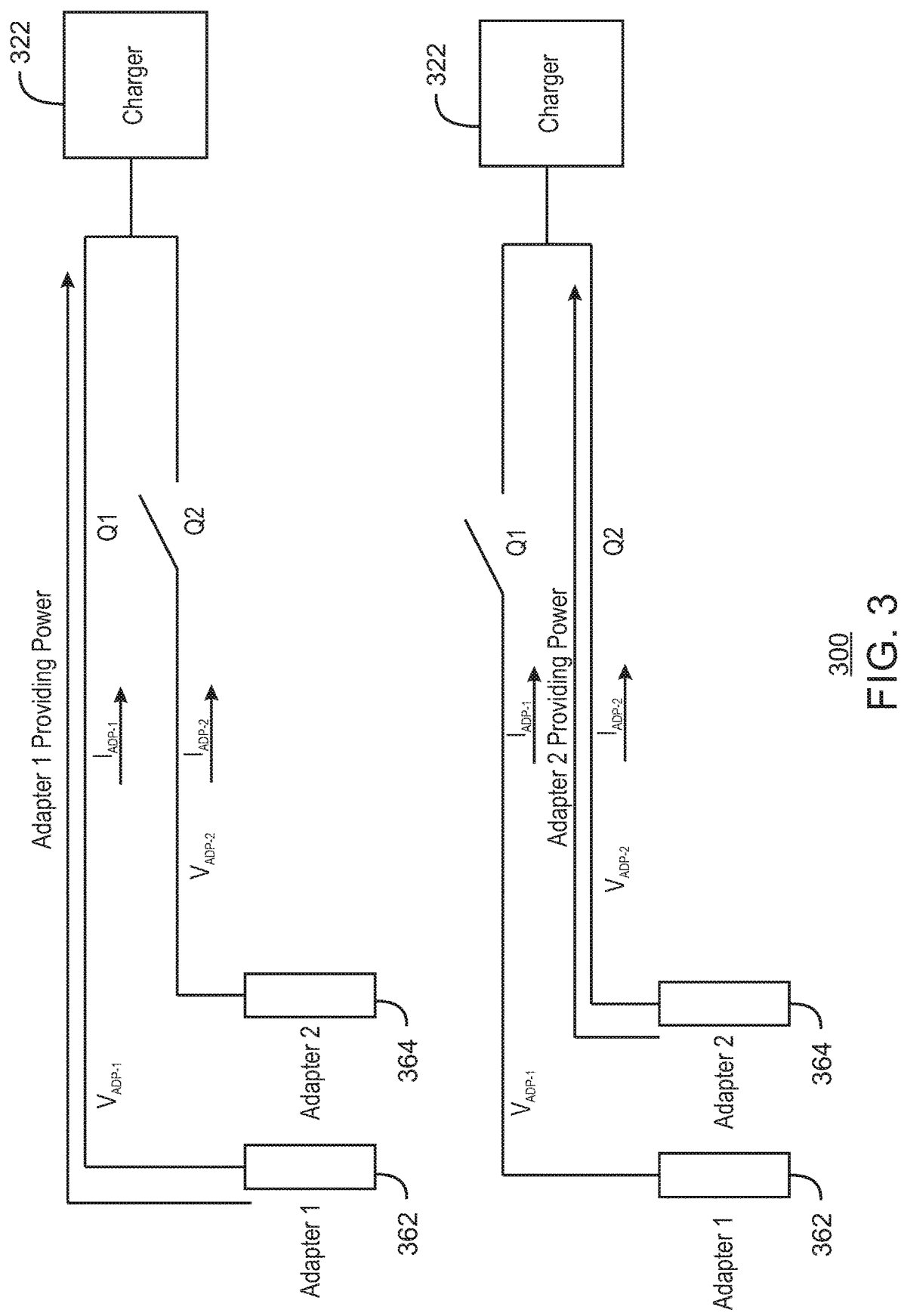
FIG. 3 illustrates a system in which coupling of adapters to a charger may be switched in accordance with some embodiments.

FIG. 3 illustrates a system 300 in accordance with some embodiments. In some embodiments, system 300 illustrates a system that may be included in system 200 of FIG. 2, for example. In some embodiments, system 300 illustrates a system in which provision of power to a charger is switched between adapters. System 300 includes an adapter 362 (Adapter 1), an adapter 364 (Adapter 2), and a charger 322. In some embodiments, adapter 362 may be the same as or similar to an adapter coupled to adapter port 212 in system 200, and/or adapter 364 may be the same as or similar to an adapter coupled to adapter port 214 in system 200. In some embodiments, charger 322 may be the same as or similar to charger 226 of system 200. In some embodiments, charger 322 may be a battery charger, a buck charger, a boost charger, an NVDC charger, a buck boost NVDC charger, and/or a buck boost charger.

In some embodiments, system 300 (and/or a system or device charged by charger 322) will consume power from one adapter for a certain amount of time. For example, as illustrated in the top portion of FIG. 3, the system 300 and/or a system or device charged by charger 322 will consume power from adapter 362 for a certain amount of time, as illustrated by the "Adapter 1 Providing Power" arrow in FIG. 3. Then system 300 (and/or a system or device charged by charger 322) will consume power from adapter 364, as illustrated by the "Adapter 2 Providing Power" arrow in FIG. 3. In some embodiments, power will be consumed from adapter 362 for a certain amount of time, and then power will be consumed from adapter 364 for a certain amount of time. The consumption of power may be implemented in a round-robin approach where the coupling of adapters 362 and 364 is alternated (for example, using one or more controllers and/or one or more switches such as switches Q1 and Q2) to provide power and/or charging from each adapter. This may be implemented, for example, by alternately consuming more power from each adapter than the adapter is designed for a short enough duration that the integrity of each adapter is not compromised. Such an approach (for example, a round-robin approach cycling and/or alternating between adapters 362 and 364) may allow consumed power to be averaged and be approximately equal to a sum of the power of each power adapter 362 and 364 (for example, where adapters 362 and 364 are each AC adapters). During each duration, the system can consume more power from each adapter than for which the adapter is rated for a short enough duration that the integrity of the adapter is not compromised. Adapter protection and output decoupling may be used in accordance with some embodiments. After output decoupling of one adapter is exhausted, for example, the system can switch to drain the power from another adapter while allowing the first adapter to recover.

Figure 4:
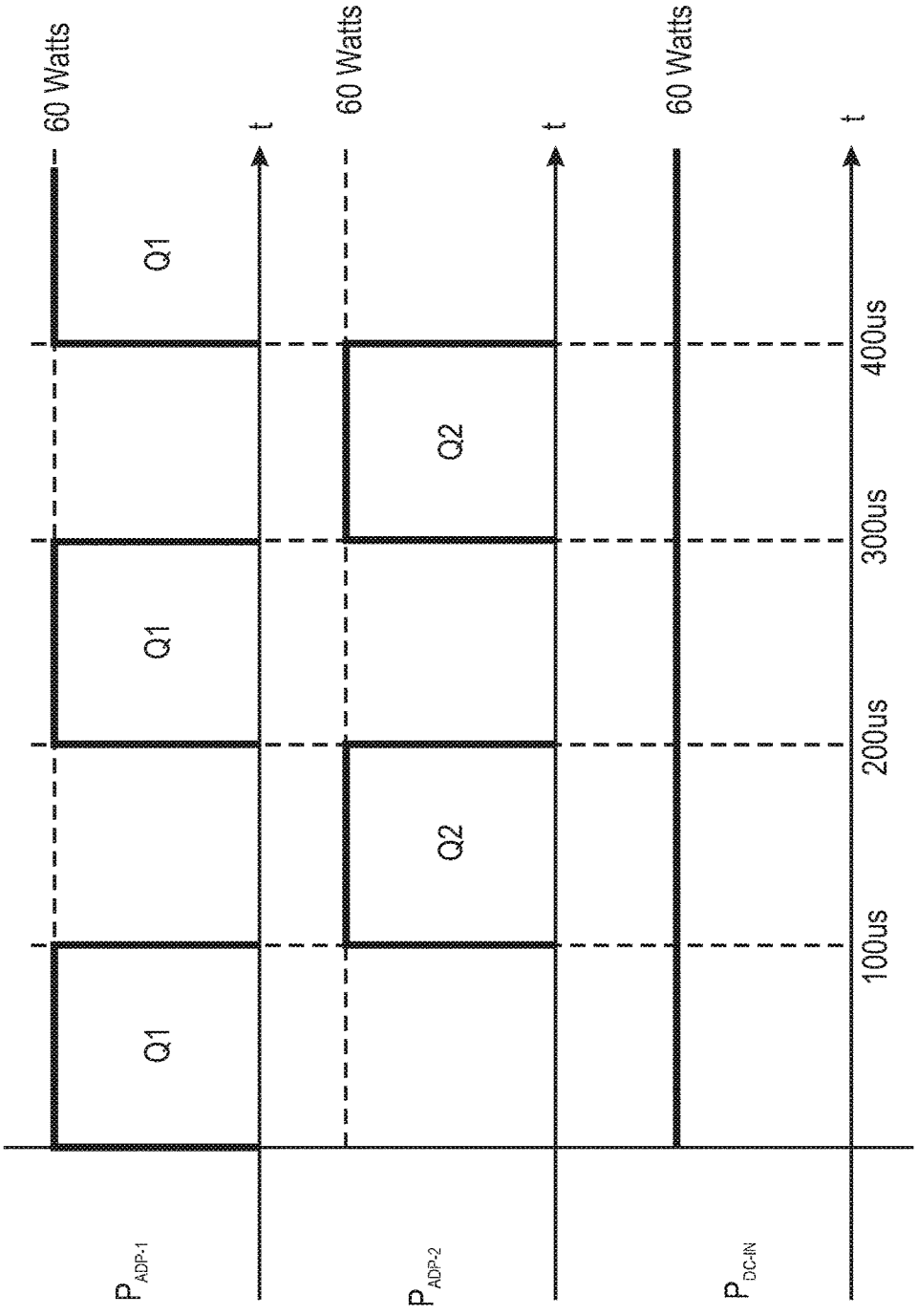
FIG. 4 illustrates a timing diagram in accordance with some embodiments.

FIG. 4 illustrates timing diagrams 400 to demonstrate how two power adapters (for example, adapter 362 and adapter 364) may be used to alternately provide power. In some embodiments, timing diagrams 400 represent dual adapter systems with each adapter having equal power ratings (for example, having equal output power capabilities). In some embodiments, for example, each of the adapters (for example, adapters 362 and 364) is rated for 30 Watts. For an amount of time that is determined and communicated prior to usage by the adapters and/or a controller such as a power delivery (PD) controller (for example, for 100 μs as illustrated in FIG. 4), FETs and/or a switch (such as switch Q1) connecting a first adapter to the system is turned ON to couple the first adapter to the system, and FETs and/or a switch (such as switch Q2) connecting a second adapter to the system is turned OFF to decouple the second adapter from the system (for example, as illustrated in the top half of FIG. 3). A charger (for example, such as charger 226, charger 322, and/or a buck-boost battery charger) may consume 60 Watts during this time, even though the coupled Adapter 1 is only rated for 30 Watts, for example. Once the time duration (for example, the time duration allowed by the Adapter 1 for over-power) is reached, the FETs and/or switch connecting Adapter 1 to the system is turned OFF to decouple Adapter 1 from the system, and the FETs and/or switch connecting Adapter 2 to the system is turned ON to couple Adapter 2 to the system (for example, as illustrated in the bottom half of FIG. 3). Adapter 2 then provides power to the system for a duration of time (for example, provides 60 Watts to the system for 100 μs as illustrated in FIG. 4), and Adapter 1 is decoupled from the system. In this manner, the total power consumed by the system may be approximately equal to the total power capability of the two adapters (for example, may be approximately 60 Watts as illustrated in FIG. 4). It is noted for even though in some embodiments illustrated in FIG. 4 that each of the adapters is rated for 30 Watts, each adapter may be capable of providing higher power (for example, capable of providing 60 Watts) for a duration of hundreds of microseconds (μs) or of milliseconds (ms). In some embodiments, time between transitions between coupling and decoupling of adapters is maximized as much as possible so that losses in the FETs and/or switches connecting the adapters to the system are minimized.

As described herein, FIG. 3 illustrates an embodiment with two adapters coupled to a system, where each adapter has an equal power rating (for example, both have a sustained power rating of 30 Watts) and both support an equal max peak power (for example, each support 60 Watts). As illustrated in FIG. 4, peak power from a first adapter (Adapter 1) is provided to the system for the first period of time (for example, the first 100 μs). Since sustained power of the first adapter is less than peak power and peak power of the first adapter might then be depleted, the first adapter then rests while peak power from a second adapter (Adapter 2) is provided to the system for the second period of time (for example, the second 100 μs). In this manner, provision of power from each adapter may be alternated while the other adapter rests so that peak power is provided from each power adapter for a short period of time. In this manner, the peak power of each of the power adapters (for example, around 60 Watts) may be continuously supplied to the system as input power $P_{DC-IN}$ even though each of the adapters are rated at a lower sustained power (for example, each adapter has a 30 Watt sustained power rating).

Figure 5:
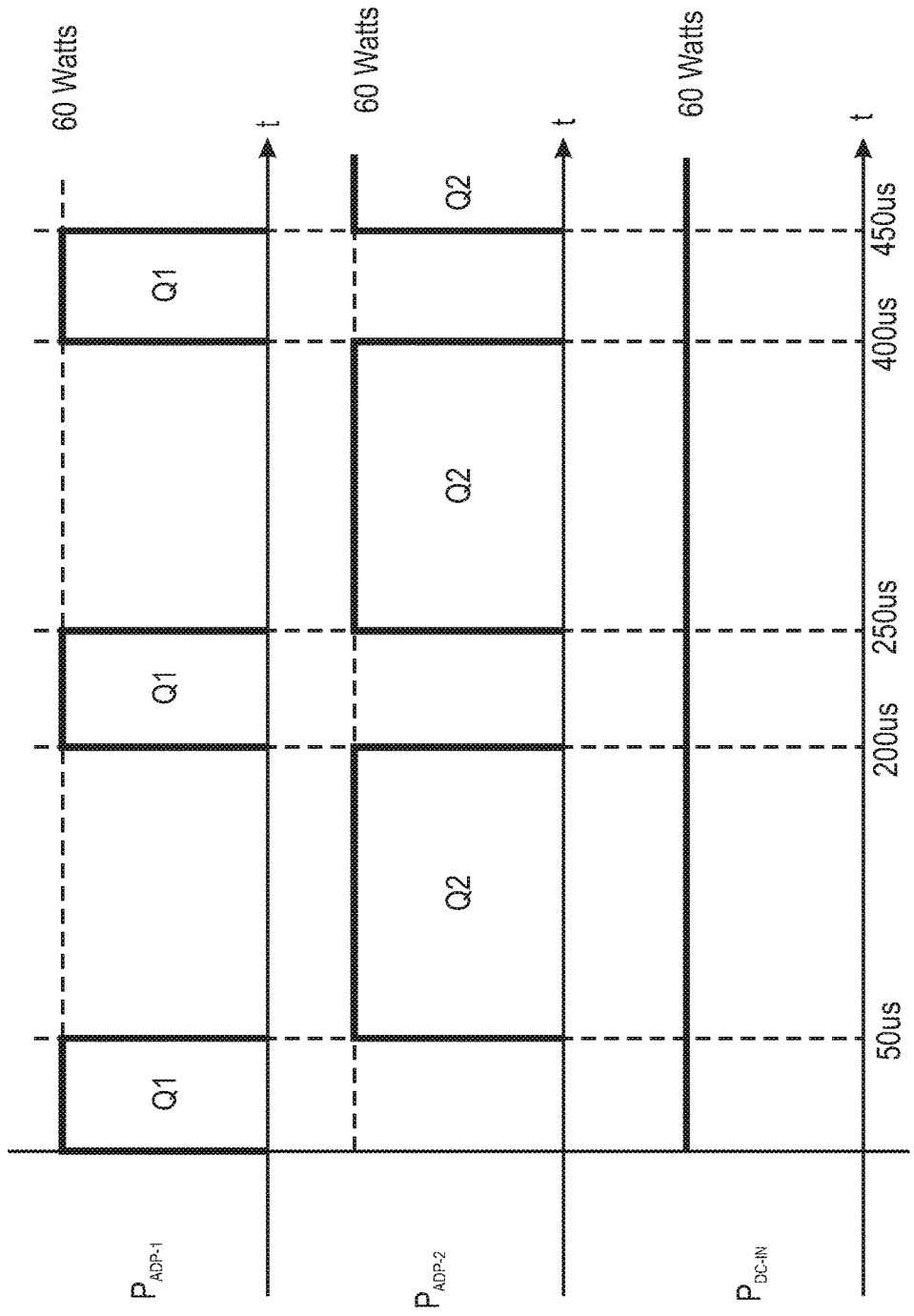
FIG. 5 illustrates a timing diagram in accordance with some embodiments.

In some embodiments, peak power (and in some cases power even higher than peak power) may be provided from a power adapter to a system for short durations. For example, as illustrated in FIG. 5, a 15 Watt rated adapter may provide 60 Watt peak power to a system for a short time. In some embodiments, even lower rated adapters may be used. For example, in some embodiments, a user may have a 30 Watt rated adapter and a 5 Watt rated adapter to alternate providing higher power to the system. In some embodiments, a user may have a few adapters with low power ratings but still be able to provide higher power to the system.

FIG. 5 illustrates timing diagrams 500 to demonstrate how two power adapters (for example, adapter 362 and adapter 364) may be used to alternately provide power. In some embodiments, timing diagrams 500 represent dual adapter systems with each adapter having different power ratings (for example, having different output power capabilities). In some embodiments, for example, a first adapter (Adapter 1 and/or adapter 362) is rated for 15 Watts, and a second adapter (Adapter 2 and/or adapter 364) is rated for 45 Watts. In some embodiments, FIG. 5 illustrates unequal time durations during which each adapter is providing a higher power (for example, providing 60 Watts). As illustrated in FIG. 5, in some embodiments, Adapter 1 (for example, adapter 362) is used to provide 60 Watts for 50 μs and Adapter 2 (for example, adapter 364) is used to provide 60 Watts for 150 μs.

For an amount of time that is determined and communicated prior to usage by the adapters and/or a controller such as a power delivery (PD) controller (for example, for 50 μs as illustrated in FIG. 5), FETs and/or a switch (such as switch Q1) connecting a first adapter to the system is turned ON to couple the first adapter to the system, and FETs and/or a switch (such as switch Q2) connecting a second adapter to the system is turned OFF to decouple the second adapter from the system (for example, as illustrated in the top half of FIG. 3). A charger (for example, such as charger 226, charger 322, and/or a buck-boost battery charger) may consume 60 Watts during this time, even though the coupled Adapter 1 is only rated for 15 Watts, for example. Once the time duration (for example, the time duration allowed by the Adapter 1 for over-power) is reached, the FETs and/or switch connecting Adapter 1 to the system is turned OFF to decouple Adapter 1 from the system, and the FETs and/or switch connecting Adapter 2 to the system is turned ON to couple Adapter 2 to the system (for example, as illustrated in the bottom half of FIG. 3).

Adapter 2 then provides power to the system for a duration of time (for example, provides 60 Watts to the system for 150 μs as illustrated in FIG. 5), and Adapter 1 is decoupled from the system. In this manner, the total power consumed by the system may be approximately equal to the total power capability of the two adapters (for example, may be approximately 60 Watts as illustrated in FIG. 5). It is noted that even though in some embodiments illustrated in FIG. 3 that the adapters are rated for 15 Watts and rated for 45 Watts, respectively, each adapter may be capable of providing higher power (for example, capable of providing 60 Watts) for a duration of hundreds of microseconds (μs) or of milliseconds (ms). In some embodiments, time between transitions between coupling and decoupling of adapters is maximized as much as possible so that losses in the FETs and/or switches connecting the adapters to the system are minimized.

Figure 6:
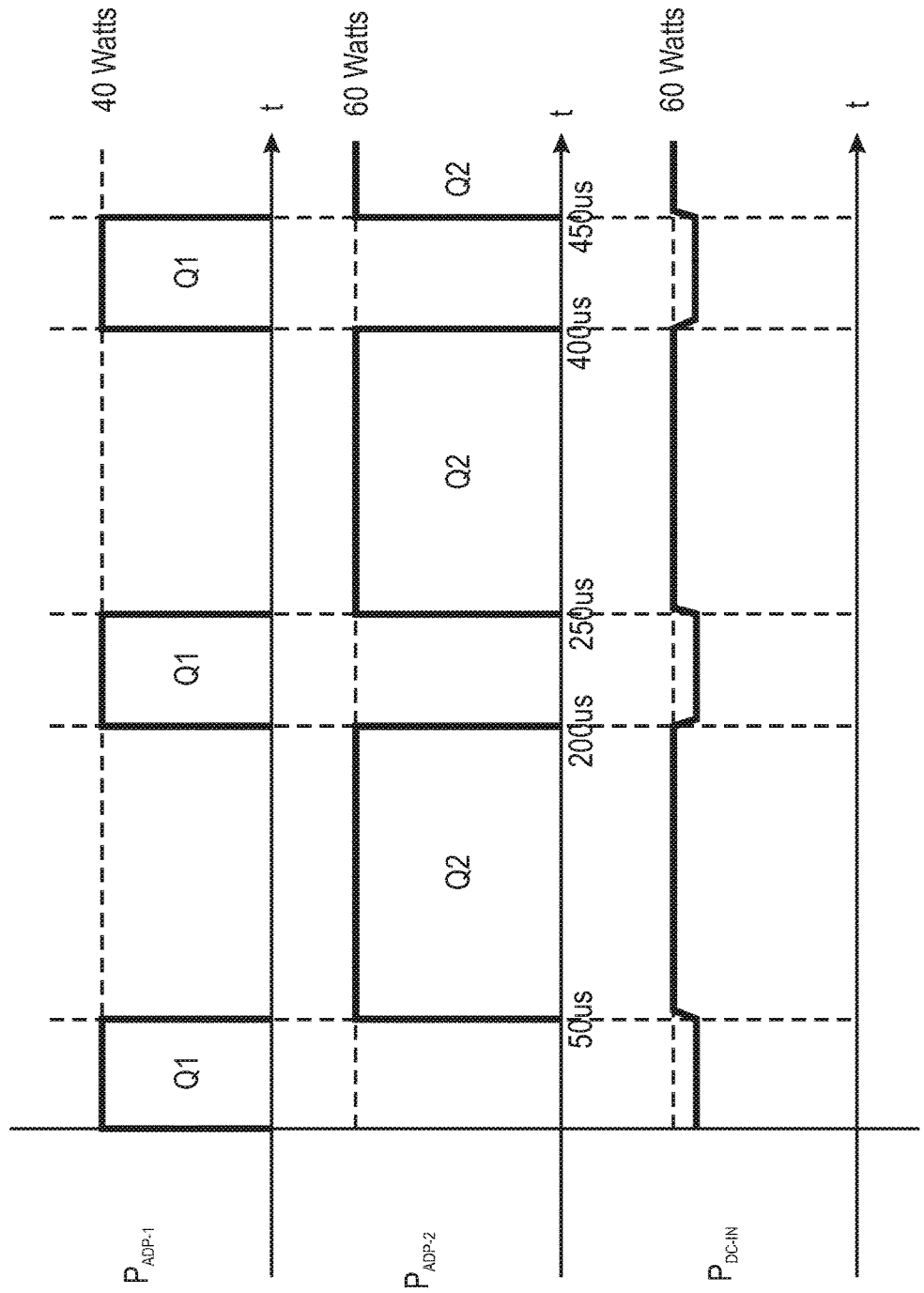
FIG. 6 illustrates a timing diagram in accordance with some embodiments.

FIG. 6 illustrates timing diagrams 600 to demonstrate how two power adapters (for example, adapter 362 and adapter 364) may be used to alternately provide power. In some embodiments, timing diagrams 600 represent dual adapter systems with each adapter having different power ratings (for example, having different output power capabilities) and having different max peak power. For example, in some embodiments, timing diagrams 600 represent dual adapter timing diagrams with the two adapters having different sustained and peak power ratings. In some embodiments, for example, a first adapter (Adapter 1 and/or adapter 362) is rated for 15 Watts with a 40 Watt max peak power, and a second adapter (Adapter 2 and/or adapter 364) is rated for 45 Watts with a 60 Watt max peak power. In some embodiments, FIG. 6 illustrates unequal time durations during which each adapter is providing a higher power (for example, providing 40 Watts and providing 60 Watts, respectively). As illustrated in FIG. 6, in some embodiments, Adapter 1 (for example, adapter 362) is used to provide a higher wattage such as 40 Watts for 50 μs and Adapter 2 (for example, adapter 364) is used to provide 60 Watts for 150 μs.

For an amount of time that is determined and communicated prior to usage by the adapters and/or a controller such as a power delivery (PD) controller (for example, for 50 μs as illustrated in FIG. 6), FETs and/or a switch (such as switch Q1) connecting a first adapter to the system is turned ON to couple the first adapter to the system, and FETs and/or a switch (such as switch Q2) connecting a second adapter to the system is turned OFF to decouple the second adapter from the system (for example, as illustrated in the top half of FIG. 3). A charger (for example, such as charger 226, charger 322, and/or a buck-boost battery charger) may consume 40 Watts during this time, even though the coupled Adapter 1 is only rated for 15 Watts, for example. Once the time duration (for example, the time duration allowed by the Adapter 1 for over-power) is reached, the FETs and/or switch connecting Adapter 1 to the system is turned OFF to decouple Adapter 1 from the system, and the FETs and/or switch connecting Adapter 2 to the system is turned ON to couple Adapter 2 to the system (for example, as illustrated in the bottom half of FIG. 3).

Adapter 2 then provides power to the system for a duration of time (for example, provides 60 Watts to the system for 150 μs as illustrated in FIG. 6), and Adapter 1 is decoupled from the system. In this manner, the total power consumed by the system may be approximately equal to the total power capability of the two adapters (for example, may be approximately at or nearly at 60 Watts as illustrated in FIG. 6). It is noted that even though in some embodiments illustrated in FIG. 3 that the adapters are rated for 15 Watts and rated for 45 Watts, respectively, each adapter may be capable of providing higher power (for example, capable of providing 40 Watts and 60 Watts, respectively) for a duration of hundreds of microseconds (μs) or of milliseconds (ms). In some embodiments, time between transitions between coupling and decoupling of adapters is maximized as much as possible so that losses in the FETs and/or switches connecting the adapters to the system are minimized.

As illustrated in FIG. 6, it is possible to combine two adapters to be coupled to a system with different durations and with different output power levels. The charger (for example, a buck-boost charger) can shift the consumed power during alternating time-length intervals to satisfy maximum power capabilities of the connected power adapters (for example, connected AC adapters) while maintaining the maximum capable average power output.

As illustrated in FIG. 6, the first adapter only has a sustained power rating of 15 Watts and a maximum peak power of 40 Watts. Therefore, in some embodiments, the power delivered from the first adapter associated with switch Q1 may be slightly lower than 60 Watts while the first adapter is coupled to the system (but higher than the 40 Watt peak power of that adapter) in some embodiments. In this manner, FIG. 6 illustrates a scenario where the first adapter may not be able to sustain a peak power at 60 Watts, but is still able to deliver power greater than the 40 Watt peak power of that adapter.

It is noted that timing durations, power ratings, sustained power ratings, and/or peak power ratings illustrated in and/or described in reference to the timing diagrams illustrated herein are used as examples only, and many other embodiments are possible.

Figure 7:
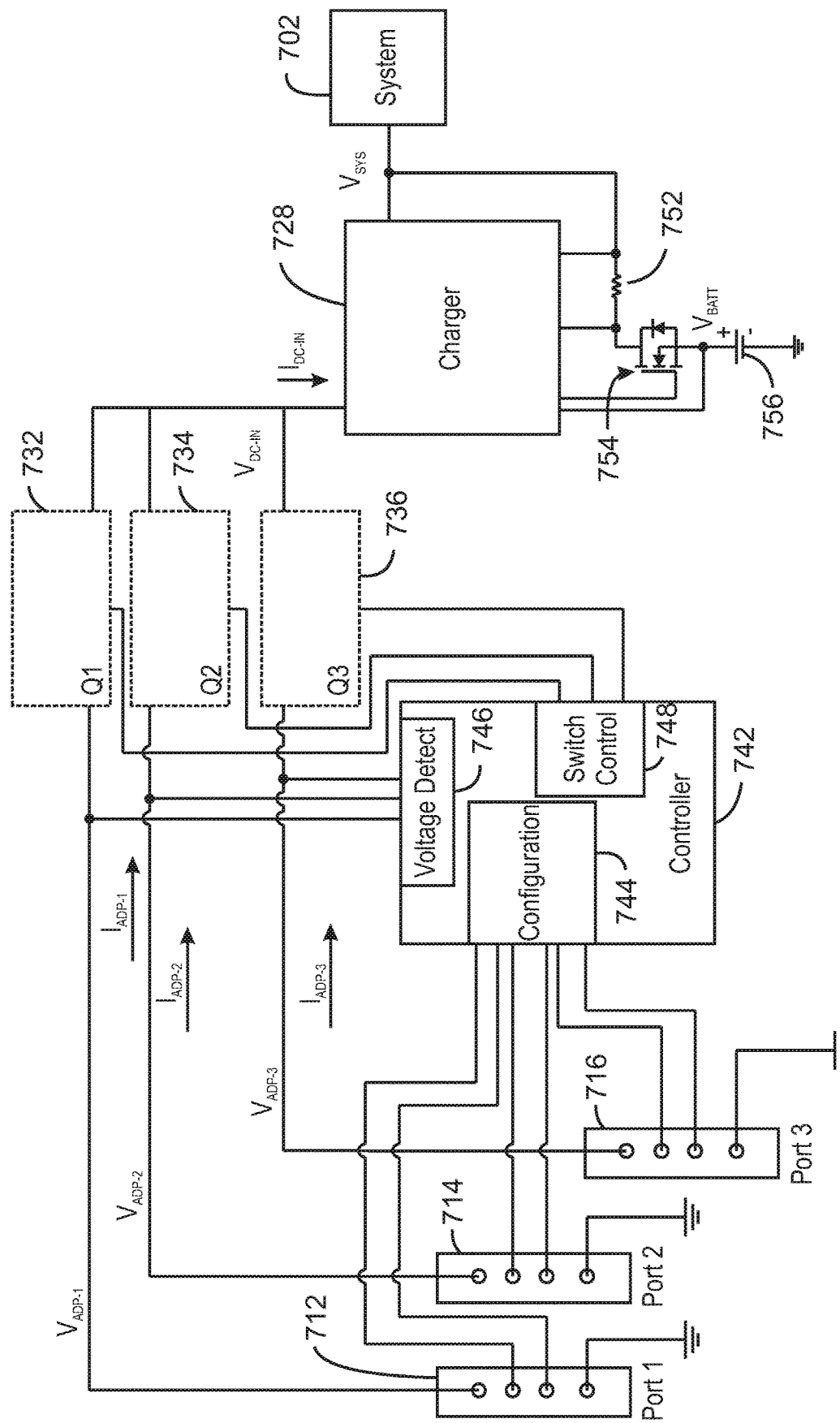
FIG. 7 illustrates a system with three ports that may be used to combine power from three adapters that may provide power to a charger in the system.

FIG. 7 illustrates a device 700 or system 700 (for example, a computing device 700 or a computing system 700). In some embodiments, computing device 700 may be a mobile computing device, for example. Device 700 may include a system 702 to which power may be supplied by two or more power adapters coupled to two or more of ports 712, 714, and 716 (for example, through two or more of port 1, port 2, and/or port 3). In some embodiments, FIG. 7 illustrates a system 700 with three or more USB Type-C ports 712, 714, and 716 used to couple two or more power adapters to system 700. Although system 700 is illustrated as including three ports and/or adapters, more ports and/or adapters may be included in some embodiments.

Adapter ports 712, 714, and 716 (or ports 712, 714, and 716 or connectors 712, 714, 716) may each include, for example, a $V_{BUS}$ voltage pin, two configuration pins such as USB Type-C configuration pins CC1 and CC2, and a ground pin GND. Device 700 may also include a charger 728 (for example, a battery charger 728, a buck charger 728, a boost charger 728, an NVDC charger 728, a buck boost NVDC charger, and/or a buck boost charger 728), switches 732, 734, and 736 (Q1, Q2, and Q3) which may include transistors such as field effect transistors (FETs), and a controller 742 (for example, a power delivery controller, and/or a USB a USB Type-C PD controller). Controller 742 may include configuration logic 744 (for example, USB Type-C CC logic), a voltage detector 746 to detect voltages $V_{ADP\text{-}1}$, $V_{ADP\text{-}2}$, and $V_{ADP\text{-}3}$, and a switch controller 748 to control switches 732, 734, and 736. Device 700 also includes a resistor 752 (which may be used as a battery current sensor 752), FET 754, and a battery 756. Adapters (and/or ports) 732, 734, and 736, charger 738, switches 732, 734, and 736, and controller 742 may be used to alternately charge battery 756 in accordance with some embodiments. In this manner, two or more power adapters such as AC power adapters (for example, two or more low power adapters such as two or more AC low power adapters) may be used to charge the device 700 as fast as possible before leaving a vicinity of a power source, for example. Alternatively, the device 700 and system 702 may be run (for example, at peak power and/or at peak performance) while the battery 756 is being simultaneously charged. In some embodiments, any number of two or more adapters and/or any number of two or more ports may be included in device 700.

In some embodiments, device 700 includes a platform with two type C USB ports 712, 714, and 716. Power from ports 712, 714, and/or 716 may be combined to power on the system 700 and/or system 702, and to charge the battery 756 when multiple power sources are connected to adapter ports 712, 714, and/or 716. As mentioned above, system 700 is not limited to three ports or to two or three external power sources. The number of external power sources that may be used to charge the system may only be limited, for example, by a number of ports (for example, by a number of USB Type C ports) on the motherboard of the system. In some embodiments, adapters connected to the ports and an adapter connected to a barrel adapter input may be combined if both power input methods are supported.

In some embodiments, in system 700 (and/or in system 100 and/or in system 200) the system 100, 102, 200, 202, 700, and/or 702 will consume power from one adapter for a certain amount of time, and then switch to another adapter (for example, will consume power from one adapter for a certain amount of time, and then switch to another adapter for a certain amount of time). In some embodiments of FIG. 7, for example, power may then be consumed from a third power adapter (for example, system 700 and/or 702 may consume power from one adapter for a certain amount of time, and then switch to another adapter for a certain amount of time, and then switch to a third adapter for a certain amount of time). The consumption of power may be implemented in a round-robin approach where the coupling of adapters is alternated (for example, using controllers and/or switches) to provide charging from each adapter. This may be implemented, for example, by consuming more power from each adapter than the adapter is designed for a short enough duration that the integrity of each adapter is not compromised. Such an approach (for example, a round-robin approach cycling and/or alternating between adapters) may allow consumed power to be averaged and be approximately equal to a sum of the power of each power adapter (for example, of each AC adapter). During each duration, the system can consume more power from each adapter than for which the adapter is rated for a short enough duration that the integrity of the adapter is not compromised. Adapter protection and output decoupling may be used in accordance with some embodiments. After output decoupling of a first adapter is exhausted, for example, the system can switch to drain the power from a second adapter while allowing the first adapter to recover. Similarly, after output decoupling of the second adapter is exhausted, for example, the system can switch to drain power from a third adapter while allowing the second adapter and/or the first adapter to recover, and so on. System 700 is not limited to three adapters and/or ports, and any number of adapters and/or ports may be used in accordance with some embodiments.

Although FIG. 7 illustrates controller 742 to provide control of the system (for example, such as controlling switches 732, 734, and 736) it is noted that in some embodiments, some or all functions of controller 742 may be implemented elsewhere. For example, in some embodiments, some or all functions of controller 742 may be included in charger 728 and/or may be included in a controller of charger 728.

Figure 8A:
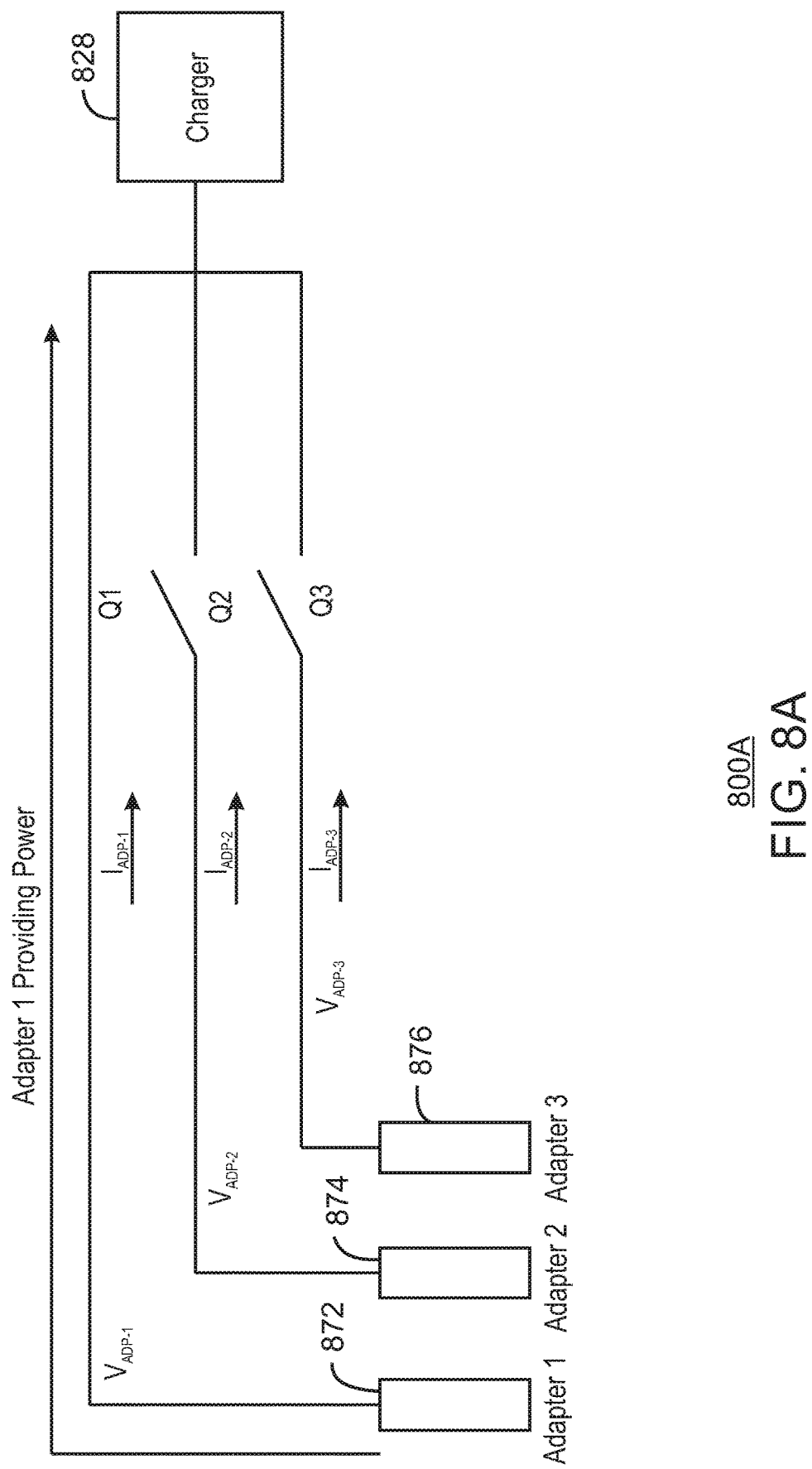
FIG. 8A, FIG. 8B, and FIG. 8C, illustrates a system in which coupling of adapters to a charger may be switched in accordance with some embodiments.
Figure 8B:
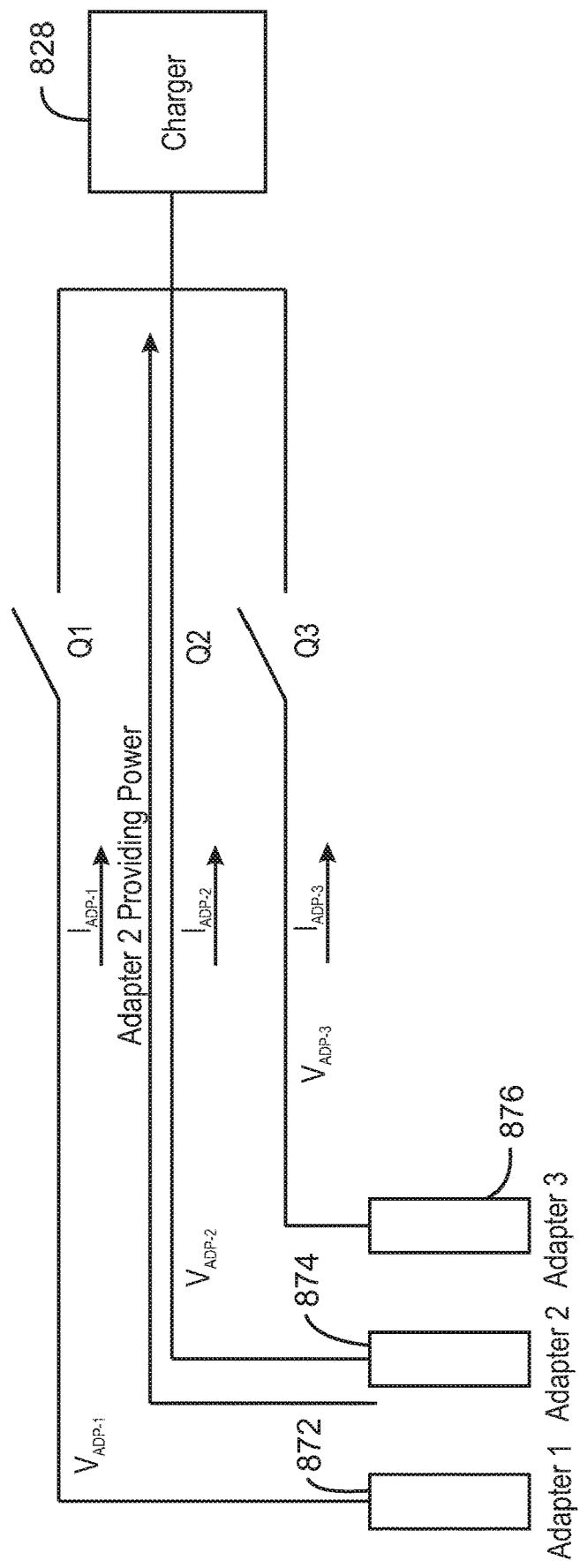
Figure 8C:
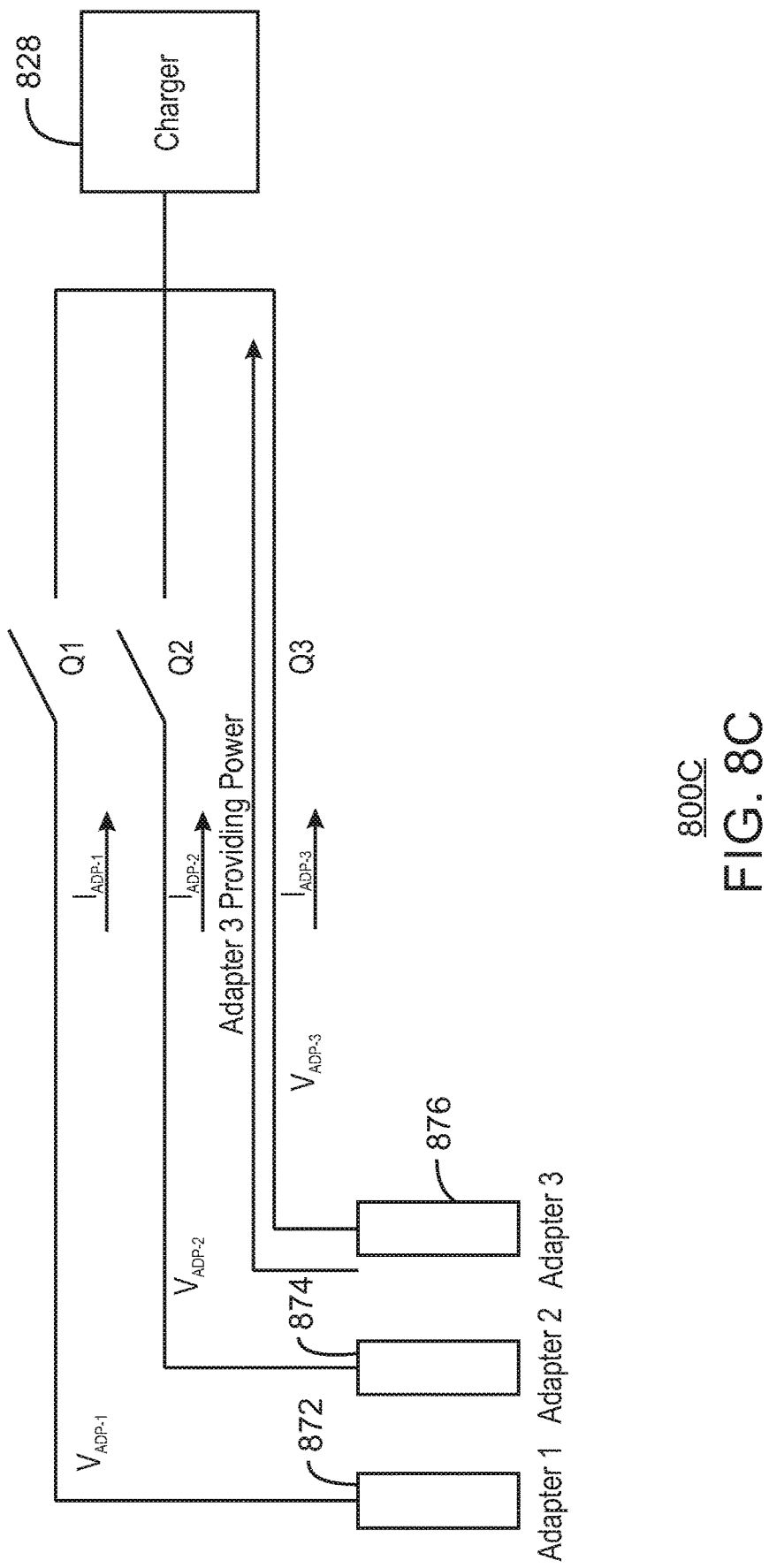

FIG. 8 illustrates one or more system in accordance with some embodiments. FIG. 8 includes FIG. 8A illustrating a system 800A in accordance with some embodiments, FIG. 8B illustrating a system 800B in accordance with some embodiments, and FIG. 8C illustrating a system 800C in accordance with some embodiments. It is noted that system 800A, system 800B, and system 800C may all be the same system at different times as described herein.

In some embodiments, systems 800A, 800B, and/or 800C illustrate a system that may be included in system 700 of FIG. 7, for example. In some embodiments, systems 800A, 800B, and/or 800C illustrate a system in which provision of power to a charger is switched between adapters. System 800A, 800B, and 800C include an adapter 872 (Adapter 1), an adapter 874 (Adapter 2), an adapter 876 (Adapter 3), and a charger 828. In some embodiments, adapter 872 may be the same as or similar to an adapter coupled to adapter port 212 in system 200, and/or may be the same as or similar to an adapter coupled to adapter port 362 in system 300. In some embodiments, adapter 874 may be the same as or similar to an adapter coupled to adapter port 214 in system 200, and/or may be the same as or similar to an adapter coupled to adapter port 364 in system 300. In some embodiments, charger 828 may be the same as or similar to charger 322 of system 300, and/or may be the same as or similar to charger 226 of system 200. In some embodiments, charger 828 may be a battery charger, a boost charger, a buck charger, an NVDC charger, a buck boost NVDC charger, and/or a buck boost charger.

In some embodiments, system 800 (and/or a system or device charged by charger 828) will consume power from one adapter for a certain amount of time. For example, as illustrated in FIG. 8A, the system 800A and/or a system or device charged by charger 828 will consume power from adapter 872 for a certain amount of time, as illustrated by the "Adapter 1 Providing Power" arrow in FIG. 8A. Then system 800B (and/or a system or device charged by charger 828) will consume power from adapter 874, as illustrated by the "Adapter 2 Providing Power" arrow in FIG. 8B. Then system 800C (and/or a system or device charged by charger 828) will consume power from adapter 876, as illustrated by the "Adapter 3 Providing Power" arrow in FIG. 8C. In some embodiments, power will be consumed from adapter 872 for a certain amount of time, then power will be consumed from adapter 874 for a certain amount of time, and then power will be consumed from adapter 876 for a certain amount of time. The consumption of power may be implemented in a round-robin approach where the coupling of adapters 872, 874, and 876 is alternated (for example, using one or more controllers and/or one or more switches such as switches Q1, Q2, and Q3) to provide power and/or charging from each adapter. This may be implemented, for example, by alternately consuming more power from each adapter than the adapter is designed for a short enough duration that the integrity of each adapter is not compromised. Such an approach (for example, a round-robin approach cycling and/or alternating between adapters 872, 874, and 876) may allow consumed power to be averaged and be approximately equal to a sum of the power of each power adapter 872, 874, and 876 (for example, where adapters 872, 874, and 876 are each AC adapters). During each duration, the system can consume more power from each adapter than for which the adapter is rated for a short enough duration that the integrity of the adapter is not compromised. Adapter protection and output decoupling may be used in accordance with some embodiments. After output decoupling of one adapter is exhausted, for example, the system can switch to drain the power from another adapter while allowing the first adapter to recover, and so on.

Figure 9:
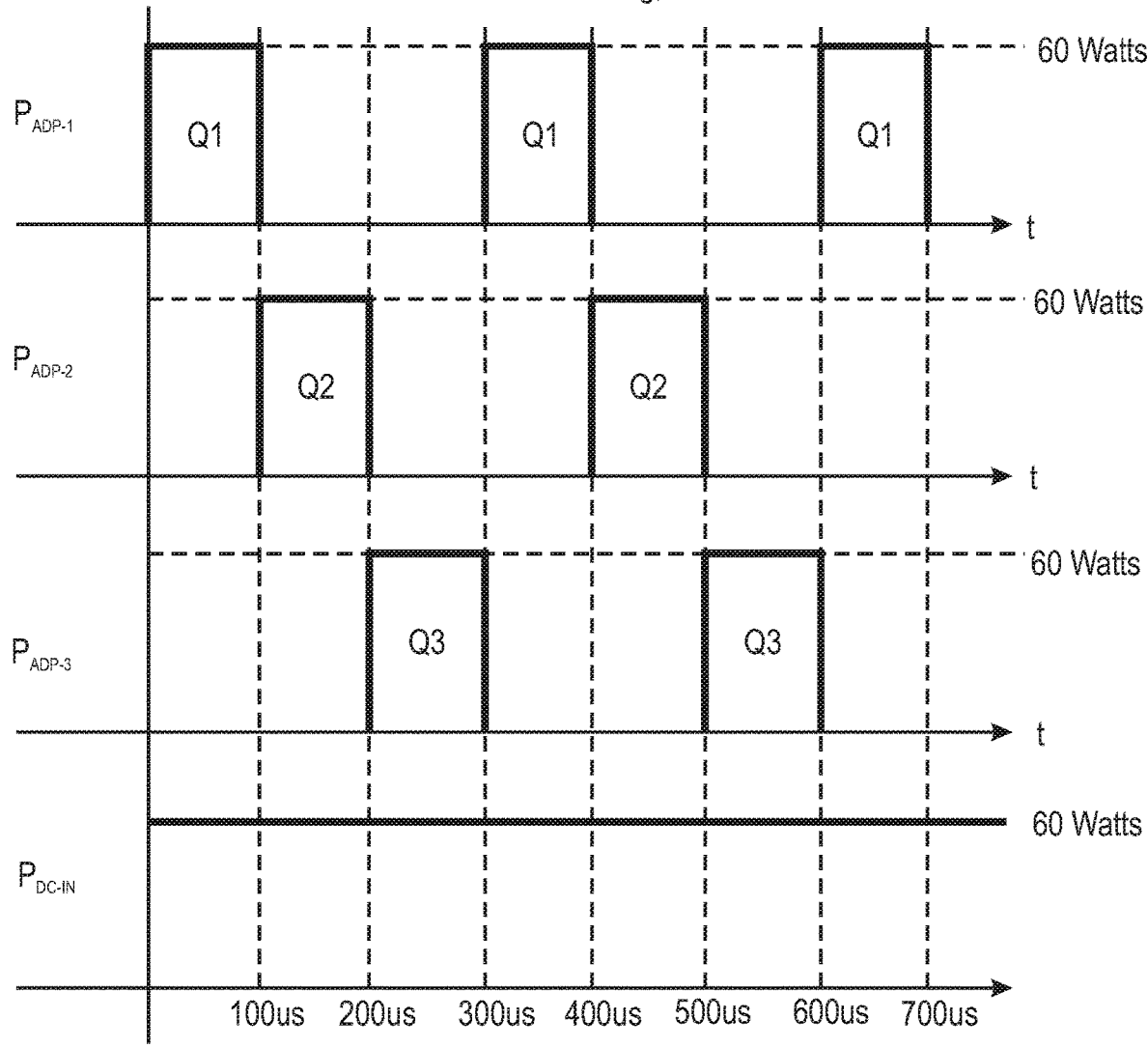
FIG. 9 illustrates a timing diagram in accordance with some embodiments.

FIG. 9 illustrates timing diagrams 900 to demonstrate how three power adapters (for example, adapters 872, 874, and 876) may be used to alternately provide power. In some embodiments, timing diagrams 900 represent three adapter systems with each adapter having equal power ratings (for example, having equal output power capabilities). In some embodiments, for example, each of the adapters (for example, adapters 872, 874, and 876) is rated for 20 Watt sustained power and 60 Watt maximum peak power.

For an amount of time that is determined and communicated prior to usage by the adapters and/or a controller such as a power delivery (PD) controller (for example, for 100 μs as illustrated in FIG. 9), FETs and/or a switch (such as switch Q1) connecting a first adapter to the system is turned ON to couple the first adapter to the system, FETs and/or a switch (such as switch Q2) connecting a second adapter to the system is turned OFF to decouple the second adapter from the system, and FETs and/or a switch (such as switch Q3) connecting a third adapter to the system is turned OFF to decouple the second adapter from the system (for example, as illustrated in FIG. 8A). A charger (for example, such as charger 728, charger 828, and/or a buck-boost battery charger) may consume 60 Watts during this time, even though the coupled Adapter 1 is only rated for 20 Watts, for example. Once the time duration (for example, the time duration allowed by the Adapter 1 for over-power) is reached, the FETs and/or switch connecting Adapter 1 to the system is turned OFF to decouple Adapter 1 from the system, the FETs and/or switch connecting Adapter 2 to the system is turned ON to couple Adapter 2 to the system, and the FETs and/or switch connecting Adapter 3 to the system is turned OFF to decouple Adapter 3 from the system (for example, as illustrated in FIG. 8B). Adapter 2 then provides power to the system for a duration of time (for example, provides 60 Watts to the system for 100 μs as illustrated in FIG. 9), and Adapter 1 and Adapter 3 are decoupled from the system. Once that time duration (for example, the time duration allowed by the Adapter 2 for over-power) is reached, the FETs and/or switch connecting Adapter 1 to the system is turned OFF to decouple Adapter 1 from the system, the FETs and/or switch connecting Adapter 2 to the system is turned OFF to decouple Adapter 2 from the system, and the FETs and/or switch connecting Adapter 3 to the system is turned ON to couple Adapter 3 to the system (for example, as illustrated in FIG. 8C). Adapter 3 then provides power to the system for a duration of time (for example, provides 60 Watts to the system for 100 μs as illustrated in FIG. 9), and Adapter 1 and Adapter 2 are decoupled from the system. In this manner, the total power consumed by the system may be approximately equal to the total power capability of the three adapters (for example, may be approximately 60 Watts as illustrated in FIG. 9). It is noted that even though in some embodiments illustrated in FIG. 9 that each of the three adapters is rated for 20 Watts, each adapter may be capable of providing higher power (for example, capable of providing 60 Watts) for a duration of hundreds of microseconds (μs) or of milliseconds (ms). In some embodiments, time between transitions between coupling and decoupling of adapters is maximized as much as possible so that losses in the FETs and/or switches connecting the adapters to the system are minimized.

Figure 10:
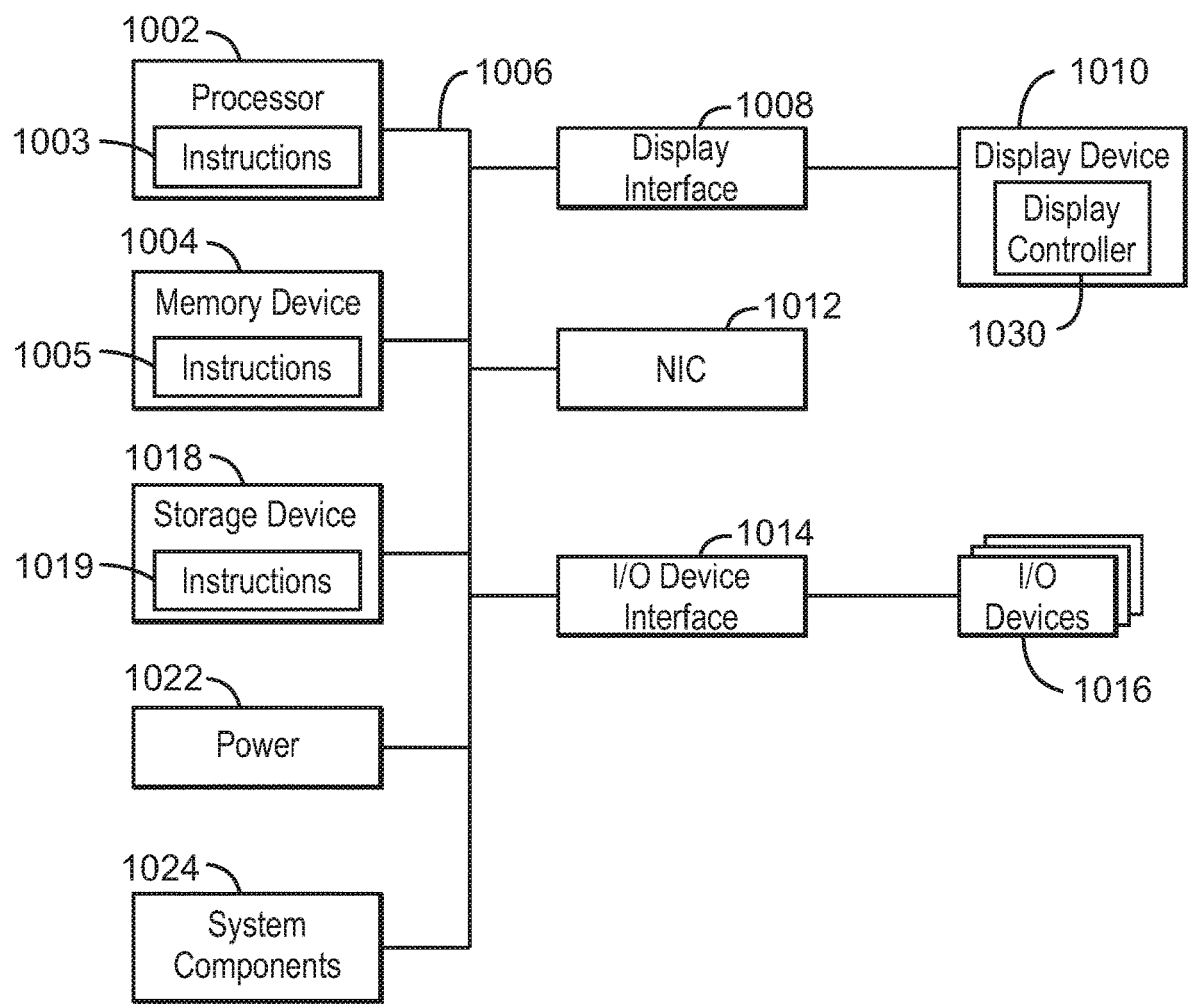
FIG. 10 illustrates a computing device in accordance with some embodiments.

FIG. 10 is a block diagram of an example of a computing device 1000 in accordance with some embodiments. In some embodiments, computing device 1000 may be a computing device including one or more elements of system 100, system 200, system 300, system 700, system 800A, system 800B, and/or system 800C. For example, in some embodiments, computing device 1000 can implement any of the techniques illustrated and/or described herein.

In some embodiments, functions of computing device 1000 can include, for example, to battery charging, charging using multiple power inputs and/or multiple power adapters, dual input charging, multiple input charging, dual input charging and/or multiple input charging for a Narrow Voltage Direct Charging (NVDC) charger, and/or dual input charging and/or multiple input charging for a buck-boost charger. In some embodiments, any portion of the flow, circuits, devices or systems illustrated in any one or more of the figures, and any of the embodiments illustrated and/or described herein can be included in or be implemented by computing device 1000. The computing device 1000 may be, for example, a computing device, a controller, a control unit, an application specific controller, and/or an embedded controller, among others. In some embodiments, computing device 1000 may be a mobile computing device. In some embodiments, computing device 1000 may include a battery, a charger for charging the battery, and a controller to control power provision to the charger and/or battery as described and/or illustrated herein. In some embodiments, for example, computing device 1000 may be the same as and/or include elements from one or more of system 100, system 200, system 300, system 700, system 800A, system 800B, and/or system 800C.

The computing device 1000 may include a processor 1002 that is adapted to execute stored instructions (for example, instructions 1003), as well as a memory device 1004 (or storage 1004) that stores instructions 1005 that are executable by the processor 1002. The processor 1002 can be a single core processor, a multi-core processor, a computing cluster, or any number of other configurations. For example, processor 1002 can be an Intel® processor such as an Intel® Celeron, Pentium, Core, Core i3, Core i5, or Core i7 processor. In some embodiments, processor 1002 can be an Intel® x86 based processor. In some embodiments, processor 1002 can be an ARM based processor. The memory device 1004 can be a memory device or a storage device, and can include volatile storage, non-volatile storage, random access memory, read only memory, flash memory, or any other suitable memory or storage systems. The instructions that are executed by the processor 1002 may also be used to implement secure battery authentication, etc. as illustrated and/or described in this specification. In some embodiments, processor 1002 may include the same or similar features or functionality as, for example, various controllers or agents in this disclosure.

The processor 1002 may also be linked through the system interconnect 1006 (e.g., PCI®, PCI-Express®, NuBus, etc.) to a display interface 1008 adapted to connect the computing device 1000 to a display device 1010. The display device 1010 may include a display controller 1030. Display device 1010 may also include a display screen that is a built-in component of the computing device 1000. The display device may also include a computer monitor, television, or projector, among others, that is externally connected to the computing device 1000. In some embodiments, computing device 1000 does not include a display interface or a display device.

In some embodiments, the display interface 1008 can include any suitable graphics processing unit, transmitter, port, physical interconnect, and the like. In some examples, the display interface 1008 can implement any suitable protocol for transmitting data to the display device 1010. For example, the display interface 1008 can transmit data using a high-definition multimedia interface (HDMI) protocol, a DisplayPort protocol, or some other protocol or communication link, and the like In addition, a network interface controller (also referred to herein as a NIC) 1012 may be adapted to connect the computing device 1000 through the system interconnect 1006 to a network (not depicted). The network (not depicted) may be a cellular network, a radio network, a wide area network (WAN), a local area network (LAN), or the Internet, among others.

The processor 1002 may be connected through system interconnect 1006 to an input/output (I/O) device interface 1014 adapted to connect the computing host device 1000 to one or more I/O devices 1016. The I/O devices 1016 may include, for example, a keyboard or a pointing device, where the pointing device may include a touchpad or a touchscreen, among others. The I/O devices 1016 may be built-in components of the computing device 1000, or may be devices that are externally connected to the computing device 1000.

In some embodiments, the processor 1002 may also be linked through the system interconnect 1006 to a storage device 1018 that can include a hard drive, a solid-state drive (SSD), a magnetic drive, an optical drive, a USB flash drive, an array of drives, or any other type of storage, including combinations thereof. In some embodiments, the storage device 1018 can include any suitable applications that can be used by processor 1002 to implement any of the techniques illustrated and/or described herein. In some embodiments, storage 1018 stores instructions 1019 that are executable by the processor 1002. In some embodiments, the storage device 1018 can include a basic input/output system (BIOS).

In some embodiments, a power device 1022 is provided. For example, in some embodiments, power device 1022 can provide any of the functionality illustrated and/or described herein. In some embodiments, any or all elements of one or more of system 100, system 200, system 300, system 700, system 800A, system 800B, and/or system 800C may be included in power device 1022. In some embodiments, for example, power device 1022 can implement battery charging, charging using multiple power inputs and/or multiple power adapters, dual input charging, multiple input charging, dual input charging and/or multiple input charging for a Narrow Voltage Direct Charging (NVDC) charger, and/or dual input charging and/or multiple input charging for a buck-boost charger. In some embodiments, any portion of the flow, circuits, devices or systems illustrated in any one or more of the figures, and any of the embodiments illustrated and/or described herein can be included in or be implemented by power device 1022. In some embodiments, power device 1022 may include a battery, a charger for charging the battery, and a controller to control power provision to the charger and/or battery as described and/or illustrated herein.

In some embodiments, power 1022 can include one or more sources of power supply such as one or more power supply units (PSUs). In some embodiments, power 1022 can be a part of system 1000, and in some embodiments, power 1022 can be external to the rest of system 1000. In some embodiments, power 1022 can provide any other techniques such as those illustrated and/or described herein. For example, in some embodiments, power 1022 can provide any of the techniques as described in reference to or illustrated in any of the drawings herein.

FIG. 10 also illustrates system components 1024. In some embodiments, system components 1024 can include any of display, camera, audio, storage, modem, or memory components, or any additional system components. In some embodiments, system components 1024 can include any system components for which power, voltage, power management, etc. can be implemented according to some embodiments as illustrated and/or described herein. In some embodiments, any one or more of system components 1024 can implement any of the techniques illustrated and/or described herein, and can include any of the elements and/or system illustrated and/or described herein.

It is to be understood that the block diagram of FIG. 10 is not intended to indicate that the computing device 1000 is to include all of the components shown in FIG. 10 in all embodiments. Rather, the computing device 1000 can include fewer or additional components not illustrated in FIG. 10 (e.g., additional memory components, embedded controllers, additional modules, additional network interfaces, etc.). Furthermore, any of the functionalities of power device 1022 may be partially, or entirely, implemented in hardware or in a processor such as processor 1002. For example, the functionality may be implemented with an application specific integrated circuit, logic implemented in an embedded controller, or in logic implemented in the processor 1002, among others. In some embodiments, the functionalities of power device 1022 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 1022 can be implemented with an integrated circuit.

Figure 11:
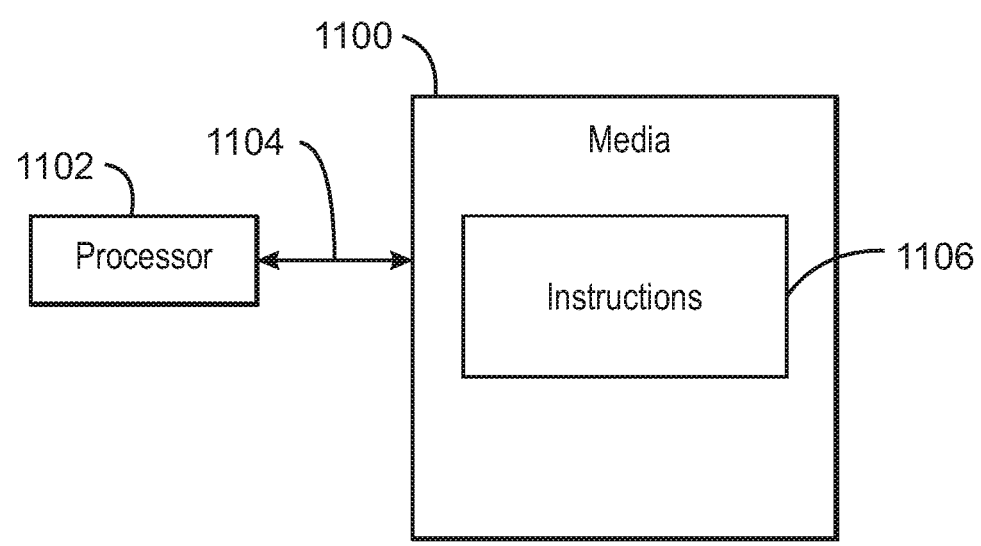
FIG. 11 illustrates one or more processor and one or more computer readable media storing instructions in accordance with some embodiments.

FIG. 11 is a block diagram of an example of one or more processors 1102 and one or more tangible, non-transitory computer readable media 1100 for implementing any of the techniques described and/or illustrated herein (for example, one or more of battery charging, charging using multiple power inputs and/or multiple power adapters, dual input charging, multiple input charging, dual input charging and/or multiple input charging for a Narrow Voltage Direct Charging (NVDC) charger, and/or dual input charging and/or multiple input charging for a buck-boost charger).

The one or more tangible, non-transitory, computer-readable media 1100 may be accessed by the processor(s) 1102 over a computer interconnect 1104. Furthermore, the one or more tangible, non-transitory, computer-readable media 1100 may include instructions (or code) 1106 to direct the processor(s) 1102 to perform operations as illustrated and/or described herein. In some embodiments, processor 1102 is one or more processors. In some embodiments, processor(s) 1102 can perform some or all of the same or similar functions that can be performed by other elements illustrated and/or described herein using instructions (code) 1106 included on media 1100 (for example, some or all of the functions or techniques illustrated in and/or described in reference to any of FIGS. 1-10). In some embodiments, one or more of processor(s) 1102 may include the same or similar features or functionality as, for example, various controllers, units, or agents, etc. illustrated and/or described in this disclosure. In some embodiments, one or more processor(s) 1102, interconnect 1104, and/or media 1100 may be included in computing device 1000.

Some embodiments have been described herein as relating to USB Type-C adapters and/or to USB Type-C adapter ports. However, it is noted that in some embodiments, any type of adapters and/or adapter ports may be used, and embodiments are not limited to those relating to USB Type-C technologies.

It is noted that various embodiments and examples may be implemented. For example, in some embodiments, adapters may have different output voltages. Any of the embodiments and/or examples described herein and/or illustrated in the drawings may include adapters with different output voltages in accordance with some embodiments.

Various components discussed in this specification may be implemented using software components. These software components may be stored on the one or more tangible, non-transitory, computer-readable media 1100, as indicated in FIG. 11. For example, battery charging, charging using multiple power inputs and/or multiple power adapters, dual input charging, multiple input charging, dual input charging and/or multiple input charging for a Narrow Voltage Direct Charging (NVDC) charger, and/or dual input charging and/or multiple input charging for a buck-boost charger, etc. may be adapted to direct the processor(s) 1102 to perform one or more of any of the operations described in this specification and/or in reference to the drawings.

It is to be understood that any suitable number of software components may be included within the one or more tangible, non-transitory computer-readable media 1100. Furthermore, any number of additional software components shown or not shown in FIG. 11 may be included within the one or more tangible, non-transitory, computer-readable media 1100, depending on the specific application.

The various techniques and/or operations described herein (for example, in reference to any one or more of FIGS. 1-11) may be performed by a control unit comprised of one or more processors, monitoring logic, control logic, software, firmware, agents, controllers, logical software agents, system agents, and/or other modules. For example, in some embodiments, some or all of the techniques and/or operations illustrated and/or described herein may be implemented by a system agent. Due to the variety of modules and their configurations that may be used to perform these functions, and their distribution through the system and/or in a different system, they are not all specifically illustrated in their possible locations in the figures.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, an apparatus is to control power provision to a computing device. The apparatus includes a controller to provide power to the computing device from a first power source at a power level above a sustained power rating of the first power source for a first time period. The controller is to provide power to the computing device from a second power source at a power level above a sustained power rating of the second power source for a second time period after the first time period.

Example 2 includes the subject matter of example 1. Example 2 includes a first switch and a second switch. The controller is to control the first switch to provide power from the first power source and to control the second switch to provide power from the second power source.

Example 3 includes the subject matter of any of examples 1-2. In example 3, the controller is to provide power to the computing device from a third power source at a power level above a sustained power rating of the third power source for a third time period after the second time period.

Example 4 includes the subject matter of example 3. Example 4 includes a first switch, a second switch, and a third switch. The controller is to control the first switch to provide power from the first power source, to control the second switch to provide power from the second power source, and to control the third switch to provide power from the third power source.

Example 5 includes the subject matter of any of examples 3-4. In example 5, the controller is to provide power to the computing device from a fourth power source at a power level above a sustained power rating of the fourth power source for a fourth time period after the third time period.

Example 6 includes the subject matter of any of examples 1-5. In example 6, a charger is to charge a battery of the computing device. The controller is to provide power to the charger from the first power source at the power level above the sustained power rating of the first power source for the first time period, and is to provide power to the charger from the second power source at the power level above the sustained power rating of the second power source for the second time period after the first time period.

Example 7 includes the subject matter of any of examples 1-6. In example 7, the controller is to provide power to the computing device from the first power source at a power level above the sustained power rating of the first power source for a third time period after the second time period.

Example 8 includes the subject matter of example 7. In example 8, the controller is to provide power to the computing device from the second power source at a power level above the sustained power rating of the second power source for a fourth time period after the third time period.

Example 9 includes the subject matter of any of examples 1-8. In example 9, the controller is to alternate providing power to the computing device using the first power source and the second power source.

Example 10 includes the subject matter of any of examples 1-9. In example 10, the controller is to provide a total power to the computing device that is approximately equal to a total power capability of the first power source and the second power source.

Example 11 includes the subject matter of any of examples 3-4. In example 11, the controller is to provide a total power to the computing device that is approximately equal to a total power capability of the first power source, the second power source, and the third power source.

Example 12 includes the subject matter of example 5. In example 12, the controller is to provide a total power to the computing device that is approximately equal to a total power capability of the first power source, the second power source, the third power source, and the fourth power source.

Example 13 includes the subject matter of any of examples 1-12. In example 13, the sustained power rating of the first power source is the same as the sustained power rating of the second power source.

Example 14 includes the subject matter of any of examples 1-12. In example 14, the sustained power rating of the first power source is different than the sustained power rating of the second power source.

Example 15 includes the subject matter of any of examples 1-14. In example 15, the power level above the sustained power rating of the first power source is approximately equal to a maximum peak power of the first power source and the power level above the sustained power rating of the second power source is approximately equal to a maximum peak power of the second power source.

Example 16 includes the subject matter of any of examples 1-15. In example 16, the power level above the sustained power rating of the first power source is higher than a maximum peak power of the first power source.

Example 17 includes the subject matter of any of examples 1-16. In example 17, the power level above the sustained power rating of the second power source is higher than a maximum peak power of the second power source.

Example 18 In some examples, a method of controlling power provision to a computing device includes providing power to the computing device from a first power source at a power level above a sustained power rating of the first power source for a first time period, and providing power to the computing device from a second power source at a power level above a sustained power rating of the second power source for a second time period after the first time period.

Example 19 includes the subject matter of example 18. Example 2 includes controlling a first switch to provide power from the first power source, and controlling a second switch to provide power from the second power source.

Example 20 includes the subject matter of any of examples 18-19. Example 20 includes providing power to the computing device from a third power source at a power level above a sustained power rating of the third power source for a third time period after the second time period.

Example 21 includes the subject matter of any of examples 18-20. Example 21 includes controlling a first switch to provide power from the first power source, controlling a second switch to provide power from the second power source, and controlling a third switch to provide power from the third power source.

Example 22 includes the subject matter of any of examples 18-21. Example 22 includes providing power to the computing device from a fourth power source at a power level above a sustained power rating of the fourth power source for a fourth time period after the third time period.

Example 23 includes the subject matter of any of examples 18-22. Example 23 includes charging a battery of the computing device in response to the power provided from the first power source at the power level above the sustained power rating of the first power source for the first time period, and in response to the power provided from the second power source at the power level above the sustained power rating of the second power source for the second time period after the first time period.

Example 24 includes the subject matter of any of examples 18-23. Example 24 includes providing power to the computing device from the first power source at a power level above the sustained power rating of the first power source for a third time period after the second time period.

Example 25 includes the subject matter of example 24. Example 25 includes providing power to the computing device from the second power source at a power level above the sustained power rating of the second power source for a fourth time period after the third time period.

Example 26 includes the subject matter of any of examples 18-25. Example 26 includes alternating providing power to the computing device using the first power source and the second power source.

Example 27 includes the subject matter of any of examples 18-26. Example 27 includes providing a total power to the computing device that is approximately equal to a total power capability of the first power source and the second power source.

Example 28 includes the subject matter of any of examples 18-27. In example 28, the sustained power rating of the first power source is the same as the sustained power rating of the second power source.

Example 29 includes the subject matter of any of examples 18-27. In example 29, the sustained power rating of the first power source is different than the sustained power rating of the second power source.

Example 30 includes the subject matter of any of examples 18-29. In example 30, the power level above the sustained power rating of the first power source is approximately equal to a maximum peak power of the first power source and the power level above the sustained power rating of the second power source is approximately equal to a maximum peak power of the second power source.

Example 31 includes the subject matter of any of examples 18-30. In example 31, the power level above the sustained power rating of the first power source is higher than a maximum peak power of the first power source.

Example 32 includes the subject matter of any of examples 18-31. In example 32, the power level above the sustained power rating of the second power source is higher than a maximum peak power of the second power source.

Example 33 In some examples, one or more tangible, non-transitory machine readable media include(s) a plurality of instructions that, in response to being executed on at least one processor, cause the at least one processor to provide power to a computing device from a first power source at a power level above a sustained power rating of the first power source for a first time period, and to provide power to the computing device from a second power source at a power level above a sustained power rating of the second power source for a second time period after the first time period.

Example 34 includes the subject matter of example 33. In example 34, the one or more tangible, non-transitory machine readable media include(s) a plurality of instructions that, in response to being executed on at least one processor, cause the at least one processor to control a first switch to provide power from the first power source, and to control a second switch to provide power from the second power source.

Example 35 includes the subject matter of any of examples 33-34. In example 35, the one or more tangible, non-transitory machine readable media include(s) a plurality of instructions that, in response to being executed on at least one processor, cause the at least one processor to provide power to the computing device from a third power source at a power level above a sustained power rating of the third power source for a third time period after the second time period.

Example 36 includes the subject matter of example 35. In example 36, the one or more tangible, non-transitory machine readable media include(s) a plurality of instructions that, in response to being executed on at least one processor, cause the at least one processor to control a first switch to provide power from the first power source, to control a second switch to provide power from the second power source, and to control a third switch to provide power from the third power source.

Example 37 includes the subject matter of any of examples 35-36. In example 37, the one or more tangible, non-transitory machine readable media include(s) a plurality of instructions that, in response to being executed on at least one processor, cause the at least one processor to provide power to the computing device from a fourth power source at a power level above a sustained power rating of the fourth power source for a fourth time period after the third time period.

Example 38 includes the subject matter of any of examples 33-37. In example 38, the one or more tangible, non-transitory machine readable media include(s) a plurality of instructions that, in response to being executed on at least one processor, cause the at least one processor to charge a battery of the computing device in response to the power provided from the first power source at the power level above the sustained power rating of the first power source for the first time period, and in response to the power provided from the second power source at the power level above the sustained power rating of the second power source for the second time period after the first time period.

Example 39 includes the subject matter of any of examples 33-38. In example 39, the one or more tangible, non-transitory machine readable media include(s) a plurality of instructions that, in response to being executed on at least one processor, cause the at least one processor to provide power to the computing device from the first power source at a power level above the sustained power rating of the first power source for a third time period after the second time period.

Example 40 includes the subject matter of example 39. In example 40, the one or more tangible, non-transitory machine readable media include(s) a plurality of instructions that, in response to being executed on at least one processor, cause the at least one processor to provide power to the computing device from the second power source at a power level above the sustained power rating of the second power source for a fourth time period after the third time period.

Example 41 includes the subject matter of any of examples 33-40. In example 41, the one or more tangible, non-transitory machine readable media include(s) a plurality of instructions that, in response to being executed on at least one processor, cause the at least one processor to alternate providing power to the computing device using the first power source and the second power source.

Example 42 includes the subject matter of any of examples 33-41. In example 42, the one or more tangible, non-transitory machine readable media include(s) a plurality of instructions that, in response to being executed on at least one processor, cause the at least one processor to provide a total power to the computing device that is approximately equal to a total power capability of the first power source and the second power source.

Example 43 includes the subject matter of any of examples 33-42. In example 43, the sustained power rating of the first power source is the same as the sustained power rating of the second power source.

Example 44 includes the subject matter of any of examples 33-42. In example 44, the sustained power rating of the first power source is different than the sustained power rating of the second power source.

Example 45 includes the subject matter of any of examples 33-44. In example 45, the power level above the sustained power rating of the first power source is approximately equal to a maximum peak power of the first power source and the power level above the sustained power rating of the second power source is approximately equal to a maximum peak power of the second power source.

Example 46 includes the subject matter of any of examples 33-45. In example 46, the power level above the sustained power rating of the first power source is higher than a maximum peak power of the first power source.

Example 47 includes the subject matter of any of examples 33-46. In example 47, the power level above the sustained power rating of the second power source is higher than a maximum peak power of the second power source.

Example 48 In some examples, a computing device with controller power provision. The computing device includes a battery, a charger to charge the battery, and a controller to provide power to the charger from a first power source at a power level above a sustained power rating of the first power source for a first time period, and to provide power to the charger from a second power source at a power level above a sustained power rating of the second power source for a second time period after the first time period.

Example 49 includes the subject matter of example 48. In example 49, the computing device includes a first switch and a second switch. The controller is to control the first switch to provide power from the first power source and to control the second switch to provide power from the second power source.

Example 50 includes the subject matter of any of examples 48-49. In example 50, the controller is to provide power to the charger from a third power source at a power level above a sustained power rating of the third power source for a third time period after the second time period.

Example 51 includes the subject matter of any of examples 48-50. In example 51, the computing device includes a first switch, a second switch, and a third switch. The controller is to control the first switch to provide power from the first power source, to control the second switch to provide power from the second power source, and to control the third switch to provide power from the third power source.

Example 52 includes the subject matter of any of examples 48-51. In example 52, the controller is to provide power to the computing device from a fourth power source at a power level above a sustained power rating of the fourth power source for a fourth time period after the third time period.

Example 53 includes the subject matter of any of examples 48-52. In example 53, the charger is to charge the battery of the computing device. The controller is to provide power to the charger from the first power source at the power level above the sustained power rating of the first power source for the first time period, and is to provide power to the charger from the second power source at the power level above the sustained power rating of the second power source for the second time period after the first time period.

Example 54 includes the subject matter of any of examples 48-53. In example 54, the controller is to provide power to the charger from the first power source at a power level above the sustained power rating of the first power source for a third time period after the second time period.

Example 55 includes the subject matter of example 54. In example 55, the controller is to provide power to the computing device from the second power source at a power level above the sustained power rating of the second power source for a fourth time period after the third time period.

Example 56 includes the subject matter of any of examples 48-55. In example 56, the controller is to alternate providing power to the charger using the first power source and the second power source.

Example 57 includes the subject matter of any of examples 48-56. In example 57, the controller is to provide a total power to the charger that is approximately equal to a total power capability of the first power source and the second power source.

Example 58 includes the subject matter of any of examples 48-57. In example 58, the sustained power rating of the first power source is the same as the sustained power rating of the second power source.

Example 59 includes the subject matter of any of examples 48-57. In example 59, the sustained power rating of the first power source is different than the sustained power rating of the second power source.

Example 60 includes the subject matter of any of examples 48-59. In example 60, the power level above the sustained power rating of the first power source is approximately equal to a maximum peak power of the first power source and the power level above the sustained power rating of the second power source is approximately equal to a maximum peak power of the second power source.

Example 61 includes the subject matter of any of examples 48-60. In example 61, the power level above the sustained power rating of the first power source is higher than a maximum peak power of the first power source.

Example 62 includes the subject matter of any of examples 48-61. In example 62, the power level above the sustained power rating of the second power source is higher than a maximum peak power of the second power source.

Example 63 In some examples, machine-readable storage includes machine-readable instructions, when executed, to implement a method or realize an apparatus as in any other example.

Example 64 In some examples, one or more machine readable medium include(s) code, when executed, to cause a machine to perform the method of any other example.

Example 65 In some examples, an apparatus includes means to perform a method as in any other example.

Example 66 In some examples, an apparatus includes a control unit. The apparatus includes means to perform a method as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus, comprising:
    a first switch connected to a first Universal Serial Bus (USB) port of a computing device;
    a second switch connected to a second USB port of the computing device;
    wherein the first switch is to receive power from a first power source via the first USB port and the second switch is to receive power from a second power source via the second USB port; and
    a controller to control the first switch and the second switch to allow the computing device to consume power from the first power source at a power level above a sustained power rating of the first power source for a first time period, and to consume power from the second power source at a power level above a sustained power rating of the second power source for a second time period after the first time period, wherein the sustained power rating of the first power source is the same as the sustained power rating of the second power source, the power level above the sustained power rating of the first power source is equal to the power level above the sustained power rating of the second power source, and the first time period is equal to the second time period.

2. The apparatus of claim 1, wherein the controller is to provide power to the computing device from a third power source at a power level above a sustained power rating of the third power source for a third time period after the second time period.

3. The apparatus of claim 2, further comprising a third switch, the controller to control the first switch to provide power from the first power source, to control the second switch to provide power from the second power source, and to control the third switch to provide power from the third power source.

4. The apparatus of claim 2, wherein the controller is to provide power to the computing device from a fourth power source at a power level above a sustained power rating of the fourth power source for a fourth time period after the third time period.

5. The apparatus of claim 1, further comprising:
    one charger to charge a battery of the computing device, wherein the first switch and the second switch are connected to the one charger, and the controller is to provide power to the one charger from the first power source at the power level above the sustained power rating of the first power source for the first time period, and to provide power to the one charger from the second power source at the power level above the sustained power rating of the second power source for the second time period.

6. The apparatus of claim 1, wherein the controller is to provide power to the computing device from the first power source at a power level above the sustained power rating of the first power source for a third time period after the second time period.

7. The apparatus of claim 6, wherein the controller is to provide power to the computing device from the second power source at a power level above the sustained power rating of the second power source for a fourth time period after the third time period.

8. The apparatus of claim 1, wherein the controller is to alternate providing power to the computing device using the first power source and the second power source.

9. The apparatus of claim 1, wherein the controller is to provide a total power to the computing device that is equal to a total power capability of the first power source and the second power source.

10. The apparatus of claim 1, wherein the power level above the sustained power rating of the first power source is equal to a maximum peak power of the first power source and the power level above the sustained power rating of the second power source is equal to a maximum peak power of the second power source.

11. The apparatus of claim 1, wherein the power level above the sustained power rating of the first power source is higher than a maximum peak power of the first power source.

12. The apparatus of claim 1, wherein the first USB port is a USB Type-C port and the second USB port is a USB Type-C port.

13. A computing device, comprising:
a first Universal Serial Bus (USB) port;
a second USB port;
a battery charger to charge a battery;
a first switch connected to the first USB port and to the battery charger;
a second switch connected to the second USB port and to the battery charger; and
a controller connected to the first switch and the second switch, the controller to control the first switch and the second switch to alternate between connecting the first USB port to the battery charger and connecting the second USB port to the battery charger, wherein:
the first USB port is to receive power from a first alternating current (AC) adapter in a first time period, the power from the first AC adapter is above a sustained power rating of the first AC adapter;
the second USB port is to receive power from a second AC adapter in a second time period, the power from the second AC adapter is above a sustained power rating of the second AC adapter;
the sustained power rating of the first AC adapter is less than the sustained power rating of the second AC adapter;
the power above the sustained power rating of the first AC adapter is equal to the power above the sustained power rating of the second AC adapter; and
the first time period is less than the second time period.

14. A method of controlling power provision to a computing device, comprising:
providing power to the computing device from a first power source at a power level above a sustained power rating of the first power source for a first time period; and
providing power to the computing device from a second power source at a power level above a sustained power rating of the second power source for a second time period after the first time period, wherein the sustained power rating of the first power source is less than the sustained power rating of the second power source, the power level above the sustained power rating of the first power source is equal to the power level above the sustained power rating of the second power source, and the first time period is less than the second time period.

15. The method of claim 14, comprising:
controlling a first switch to provide power from the first power source to one battery charger; and
controlling a second switch to provide power from the second power source to the one battery charger.

16. The method of claim 15, wherein the one battery charger is to charge a battery of the computing device in response to the power provided from the first power source at the power level above the sustained power rating of the first power source for the first time period, and in response to the power provided from the second power source at the power level above the sustained power rating of the second power source for the second time period after the first time period.

17. The method of claim 14, further comprising providing power to the computing device alternating between using the first power source and the second power source.

18. One or more tangible, non-transitory machine readable media comprising instructions that, in response to being executed by at least one processor, cause the at least one processor to:
provide power to a computing device from a first power source at a power level above a sustained power rating of the first power source for a first time period; and
provide power to the computing device from a second power source at a power level above a sustained power rating of the second power source for a second time period after the first time period, wherein the first time period is less than the second time period and the sustained power rating of the first power source is less than the sustained power rating of the second power source.

19. The one or more tangible, non-transitory machine readable media of claim 18, wherein the instructions, in response to being executed by the at least one processor, cause the at least one processor to:
control a first switch to provide power from the first power source to one battery charger of the computing device; and
control a second switch to provide power from the second power source to the one battery charger of the computing device.

20. The one or more tangible, non-transitory machine readable media of claim 18, wherein the instructions, in response to being executed by the at least one processor, cause the at least one processor to provide the power to the computing device from the first power source via a first Universal Serial Bus (USB) port of the computing device and to provide the power to the computing device from the second power source via a second USB port of the computing device.

21. The computing device of claim 13, wherein the first and second AC adapters each comprise an alternating current (AC) power adapter having a sustained power rating of as low as 5 Watts and as high as 130 Watts.

* * * * *